(12) United States Patent
Lopes et al.

(10) Patent No.: US 7,894,121 B2
(45) Date of Patent: Feb. 22, 2011

(54) LIGHT VALVE ASSEMBLY WITH A HOLOGRAPHIC OPTICAL ELEMENT AND A METHOD OF MAKING THE SAME

(75) Inventors: Vincent C. Lopes, Lucas, TX (US); Bradley Morgan Haskett, Allen, TX (US); Steven Monroe Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 415 days.

(21) Appl. No.: 11/940,609

(22) Filed: Nov. 15, 2007

(65) Prior Publication Data
US 2009/0128873 A1  May 21, 2009

(51) Int. Cl.
G02B 26/00 (2006.01)
G02B 27/64 (2006.01)
G03H 1/10 (2006.01)

(52) U.S. Cl. .................. 359/290; 359/291; 359/245; 359/556; 359/9; 359/10; 359/17; 359/35; 345/84; 345/87

(58) Field of Classification Search ............ 359/245, 359/290–295, 298, 237, 619, 556, 558, 563, 359/1, 9–11, 15–20; 345/85, 87, 156; 353/30, 353/99, 121; 315/169.1, 169.3; 250/492.22; 378/34

See application file for complete search history.

(56) References Cited

U.S. PATENT DOCUMENTS

| | | | |
|---|---|---|---|
| 5,170,269 A * | 12/1992 | Lin et al. | 359/9 |
| 6,570,681 B1 * | 5/2003 | Favalora et al. | 359/17 |
| 6,940,653 B2 * | 9/2005 | Favalora et al. | 359/619 |
| 7,099,084 B2 * | 8/2006 | Bi | 359/565 |
| 2002/0044445 A1 | 4/2002 | Bohler et al. | |
| 2006/0279816 A1 | 12/2006 | Duncan | |
| 2007/0058143 A1 | 3/2007 | Penn et al. | |

* cited by examiner

*Primary Examiner*—Loha Ben
(74) *Attorney, Agent, or Firm*—Charles A. Brill; Wade James Brady, III; Frederick J. Telecky, Jr.

(57) ABSTRACT

A light valve assembly comprises a holographic optical element and a light valve that comprises an array of individually addressable pixels. The light valve assemblies can be fabricated on the die level or on a wafer-level.

26 Claims, 23 Drawing Sheets

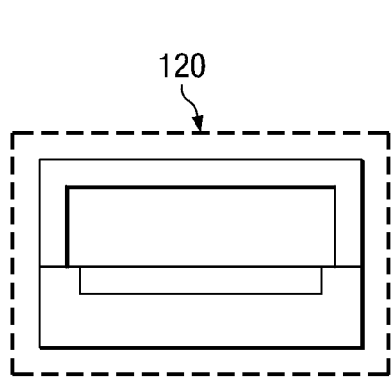
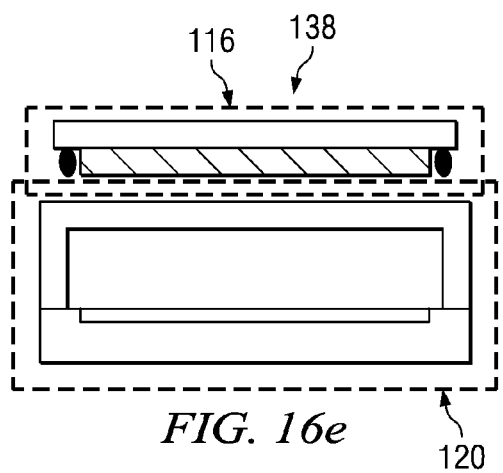
FIG. 16d
FIG. 16e
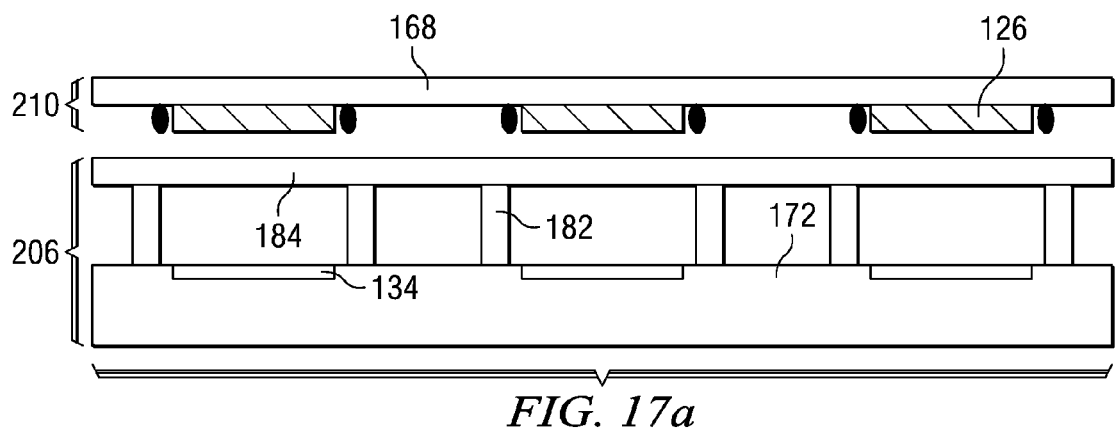
FIG. 17a
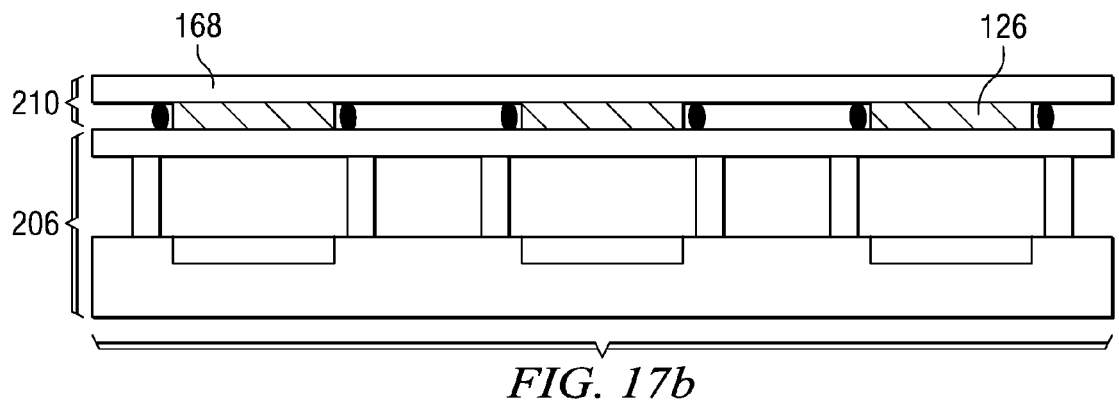
FIG. 17b
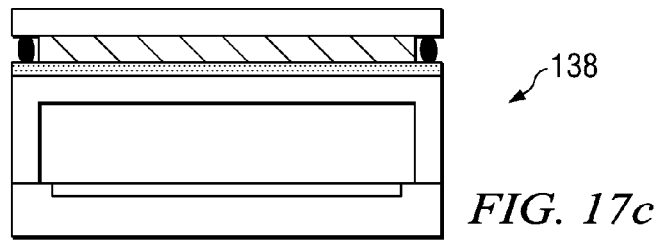
FIG. 17c

LIGHT VALVE ASSEMBLY WITH A HOLOGRAPHIC OPTICAL ELEMENT AND A METHOD OF MAKING THE SAME

CROSS-REFERENCE TO RELATED CASES

The subject matter of each one of the following US patent applications is incorporated herein by reference in its entirety: US 20070058143 to Penn, filed Sep. 13, 2005; and US 20060279816 to Duncan filed Jun. 9, 2005.

TECHNICAL FIELD OF THE DISCLOSURE

The technical field of this disclosure relates to the art of light valves for use in imaging systems, and more particularly to the art of light valve assemblies with holographic optical elements for use in imaging systems.

BACKGROUND OF THE DISCLOSURE

In recent years, solid-state light illuminators, such as LASERs and light-emitting-diodes (LEDs), and other narrow-banded light illuminators capable of producing phase-coherent light, such as wavelength specific plasma lamps, have drawn significant attention as alternative light sources to traditional light sources, such as arc lamps, for use in imaging systems, especially imaging systems employing light valves, due to many advantages, such as compact size, greater durability, longer operating life, and lower power consumption.

Regardless of the widely embraced superior properties of solid-state illuminators over traditional light sources, it is however difficult to optically couple solid-state illuminators with light valves. For example, it is difficult to generate a far-field illumination area with uniform illumination intensity at the light valve location using solid-state or narrow-banded light illuminators because the illumination light from the solid-state illuminators and most narrow-banded illuminators are highly collimated as compared to the light from traditional illuminators. Some existing applications of solid-state and/or narrow-banded light illuminators in imaging systems that employ light valves involve optics, such as diffusers, lenses, and other optical elements for producing appropriate far-field illumination areas at the light valve locations, and directing the highly collimated light onto and from the light valves of the imaging systems. These optical elements, as well as their optical arrangements, occupy a large amount of spaces in imaging systems, which in turn, dramatically limit reduction of imaging system sizes in forming compact and portable imaging systems. Moreover, these optical elements increase costs of the imaging system and complicate imaging system design and manufacture.

Another approach to optically couple solid-state or narrow-banded illuminators to light valves in imaging systems is to use holographic optical elements (HOE) and/or other types of optically diffractive elements. A holographic optical element is a diffractive grating with diffractive structures, such as slits, holes, and modulation index of refraction. A holographic optical element can replace a number of optical components in an imaging system, such as lenses, mirrors, beam splitters, beam combiners, optical filters, and prisms. Using holographic optical elements with light valves enables more compact and portable imaging systems than imaging systems using traditional optics with solid-state and/or narrow-banded illuminators. Most of the existing holographic approaches, however, do not provide a manufacturable method or an effective manufacturable method for fabricating and assembling holographic optical elements with light valves for use in imaging systems.

SUMMARY

In one example, a light valve assembly for use in an imaging system is disclosed. The assembly comprises: a light valve comprising an array of individually addressable pixels, wherein the light valve is enclosed in a package frame that comprises at least a light transmissive portion; a holographic optical element comprising a diffractive pattern; and wherein the holographic optical element is assembled to the light valve through the package frame so as to form an assembly.

In another example, an imaging system is disclosed herein. The system comprises: an illumination system providing illumination light for the imaging system; and a light assembly that comprises: a light valve comprising an array of individually addressable pixels, wherein the light valve is enclosed in a package frame that comprises at least a light transmissive portion; a holographic optical element comprising a diffractive pattern; and wherein the holographic optical element is assembled to the light valve through the package frame so as to form an assembly.

In another example, a method of making a light valve assembly is disclosed herein. The method comprises: forming a holographic optical element on a light transmissive wafer; providing a light valve on a light valve wafer, wherein the light valve comprising an array of individually addressable pixels; and assembling the holographic optical element with the light valves.

In yet another example, a method of making a light valve assembly is disclosed herein. The method comprises: forming a plurality of holographic optical elements on a light transmissive wafer; providing a light valve wafer formed thereon a plurality of die areas in each of which an array of pixels of a light valve is formed; disposing a plurality of package frames in the dies so as to package the light valves, wherein each package frame comprises a top surface comprising at least a portion that is transmissive to the visible light; and assembling the holographic optical elements with the light valves.

BRIEF DESCRIPTION OF DRAWINGS

FIG. 12 shows a flow chart having steps executed for making a light valve assembly illustrated in FIG. 4a;

FIG. 16a through FIG. 16e schematically illustrate yet another exemplary method of making a light valve assembly as illustrated in FIG. 4b;

FIG. 17a through FIG. 17c schematically illustrate an exemplary method of making a light valve assembly illustrated in FIG. 4b on a wafer level;

FIG. 20a through FIG. 20c schematically illustrate an exemplary method of making a light valve assembly illustrated in FIG. 5a;

FIG. 21 is a flow chart showing the steps executed for making a light valve assembly illustrated in FIG. 5a;

FIG. 29a through FIG. 29c schematically illustrate an exemplary method of making a light valve assembly illustrated in FIG. 7a;

FIG. 30 is a flow chart having steps executed for making a light vale assembly in FIG. 7a;

DETAILED DESCRIPTION OF SELECTED EXAMPLES

In view of the forgoing, disclosed herein is a light valve assembly for use in imaging systems and a method for making the same. An imaging system can be a system that is capable of processing image signals or any information-carrying optical signals (e.g. light) using a light valve. A light valve is a device that comprises an array of individually addressable pixels with each pixel having a characteristic dimension of 500 microns or less, such as 200 microns or less, 100 microns or less. The light valve can be a wide range of natures. For example, the light valve can be a spatial light modulator comprising an array of individually addressable and deflectable micromirrors, liquid-crystal-on-silicon (LCOS) cells, silicon crystal reflective display cells, or interferometric modulation cells. In other examples, the light valve can be a self-light emitting light valve, such as plasmas and organic light-emitting diode display panels.

In the following, the light valve assembly and methods of making the same will be discussed with particular examples, wherein the holographic material of the holographic optical element comprises a DiChromated Gelatin (DCG) or a photosensitive material; and the light valve is a spatial light modulator that comprises an array of individually addressable reflective and deflectable micromirrors. However, it will be appreciated by those skilled in the art that the following discussion is for demonstration purpose, and should not be interpreted as a limitation. Other variations within the scope of the disclosure are also applicable. For example, the manufacture method and light valve assemblies made thereof are also applicable to many other holographic materials, such as holographic silver halide emulsions, photosensitive materials (e.g. photopolymers, photo-crosslinkers, photothermlplastics, photochromatics, photodichronics, photosensitive glass or photosensitive materials that are transmissive to light with specific wavelengths), ferroelectric crystals, gelatin materials, polyvinyl carbazole (PVK), DMP 128 (a formulation of lithium acrylate in combination with a branched polyethylenimine), and any suitable combinations thereof. For example, a holographic optical element can comprise a silver halide film coated with a gelatin holographic material. Regardless of different holographic materials, the holographic material of the holographic optical element comprises a diffractive pattern.

Figure 1:
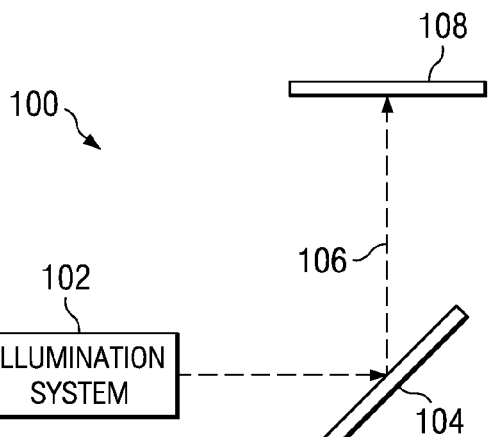
FIG. 1 schematically illustrates an exemplary imaging system employing a light valve assembly that comprises a light valve and a holographic optical element.

Referring to the drawings, FIG. 1 schematically illustrates an exemplary imaging system that employs a light valve assembly. In this particular example, imaging system 100 comprises illumination system 102, light valve assembly 104, projection lens 106, and target 108.

Illumination system 102 is capable of providing illumination light, preferably (though not required) phase-coherent illumination light, for imaging system 100. The illumination system may employ a solid-state illuminator, such as a laser and light-emitting-diode, or any other suitable illuminators, such as narrow-banded illuminators and single color illuminators (e.g. wavelength specific plasma lamps), or any suitable combinations thereof. For example, the illumination system may comprise an arc lamp and a solid-state illuminator. For providing illumination light of different colors, a set of illuminators can be employed with each desired color of light being provided by one or more illuminators. The colors of the illumination light can be any suitable colors, such as red, green, blue, yellow, cyan, magenta, white, and any desired combinations thereof. The display system as illustrated in FIG. 1 can be configured into any suitable imaging systems, such as a rear-projection system, a front-projection system, a rear-projection TV, or many other imaging systems. As a way of example, FIG. 2 schematically illustrated an exemplary illumination system of imaging system 100 in FIG. 1.

Figure 2:
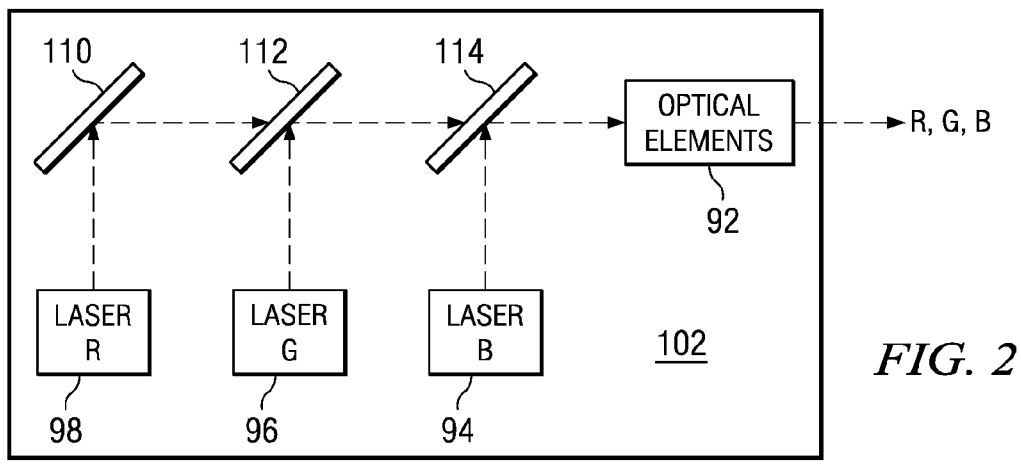
FIG. 2 schematically illustrates an exemplary illumination system that employs a set of solid-state illuminators.

Referring to FIG. 2, illumination system 102 comprises laser R 98, laser G 96, and laser B 94 respectively for providing red, green, and blue colors of laser beams for the imaging system. The red, green, and blue laser beams are directed to light valve assembly 104 (in FIG. 1) along different optical paths, or along the same optical path as shown in FIG. 2. Specifically, red filter 110 capable of reflecting red color laser beams is disposed such that the reflected red laser beams from laser R 98 propagates towards green filter 112 and blue filter 114. Green filter 112 passes the red laser beams from red filter 110 and reflects the green laser beams from laser G 96 toward blue filter 114. Blue filter 114 passes red and green laser beams incident thereto and reflects the blue laser beam from laser B 94. As such, the red, green, and blue laser beams can be combined together.

Other optical components 92, such as diffusers, lenses, prisms, light integrators, and any suitable holographic optical elements with diffractive patterns can alternatively be included in illumination system 102 when necessary. For example, one or more beam deflectors with diffractive patterns can be provided for guiding the light beams from the illuminators towards the light valve assembly along desired directions. In another example, one or more diffractive beam-splitters or beam-dispersers can be provided for guiding different portions (e.g. portions of different characteristic wavelengths) of the light from the illuminators towards the light valve assemblies (or different light valves when employed in one display system) along different optical paths.

Referring again to FIG. 1, the illumination light from illumination system 102 is directed to light valve assembly 104 that comprises a light valve having an array of individually addressable pixels (e.g. reflective and deflectable micromirrors) capable of modulating the incident light beams based upon image data (e.g. bitplane data) associated with desired images to be displayed. The modulated light can be directed to target 108 through projection lens 106. In other examples, the projection lens may not be necessary. The target (108) can be a screen of a front- or rear-projector, or alternatively can be a holographic storage medium on which holographic image information can be written and stored. Depending upon different applications, the imaging system (100) can be configured into a wide range of systems capable of producing (re-producing), processing, and/or storing images and/or image signals. For example, the imaging system can be a front- or a rear projector, a rear-projection TV, an image processing system for writing image information (signals) on holographic storage mediums, or a system for producing (e.g. regenerating) holographic images.

Figure 3:
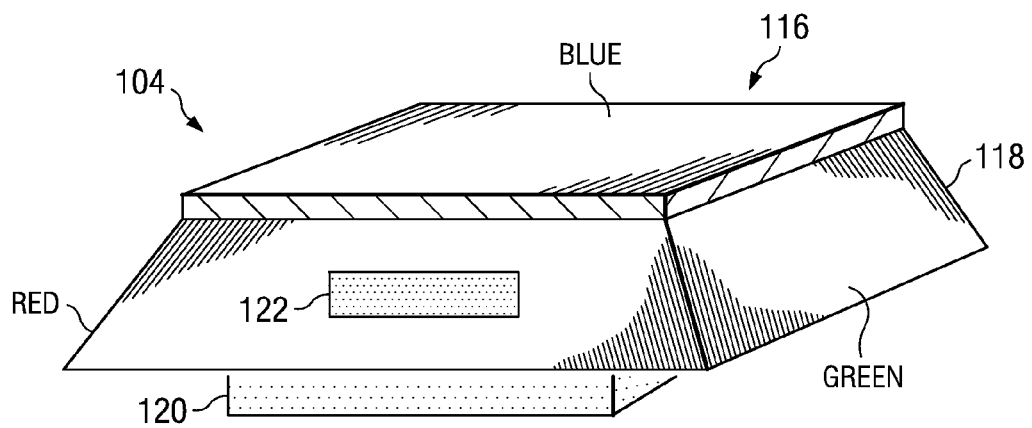
FIG. 3 schematically illustrates an exemplary light valve assembly of the imaging system in FIG. 1.

Light valve assembly 104 comprises a light valve and a holographic optical element (HOE), an exemplary of which is schematically illustrated in FIG. 3. In the particular example as shown in FIG. 3, light valve assembly 104 comprises light valve 120, light guide 118, and holographic optical element 116. The light guide (118) in this example is a trapezoidal element having an upper surface, a bottom surface, and a plurality of side facets. The light valve (120) is attached to the bottom surface of the light guide; and the holographic element (116) is attached to the top surface of the light guide. The light valve and the holographic optical element can be attached to the light guide in many ways. For example, the light valve and/or the holographic optical element can be attached to the light guide such that there is substantially no air gap between the light valve and the bottom surface and/or between the HOE and the top surface of the light guide. The attachment of the light valve (and/or the HOE) to the light guide can be accomplished through bonding with a selected bonding material or through many other possible means, such as contact without bonding.

The combination of HOE 116 and light guide 118 is provided for optically coupling the incident light (e.g. the phase-coherent light) from the illumination system to the pixels of light valve 120 such that, at the location of the pixels of the light valve, the illumination light has desired profile (e.g. a profile including, but not limited to, anyone one of or any combinations of the following characters: the shape of the illumination area, the intensity of the light across the illumination area, and the incident angle to the pixels of the light valve). For example, it is desired to have an illumination area that matches the shape of the pixel array at the location of the pixels of the light valve. At the location of the pixels of the light valve, the illumination light may be expected to have a uniform intensity distribution across the pixel array of the light valve. When the pixels of the light valve are reflective and deflectable micromirrors each having a reflective and deflectable mirror plate, the illumination light is expected to be incident onto the reflective surfaces of the mirror plates at certain incident angles.

Depending upon specific applications, the holographic optical element (116) can be transmissive or reflective to the illumination light of the imaging system. In the example as illustrated in FIG. 3, the holographic optical element is a reflective type holographic optical element; and the illumination light is directed to the holographic optical element through light guide 118.

Light guide 118 is provided for directing light of specific wavelength (e.g. red, green, blue, and other colors) from the illumination system at an appropriate incident angle onto the holographic optical element (116). Specifically, the illumination light from the illumination system (e.g. 102 in FIG. 1 and FIG. 2) are incident onto the side facets (or the overhanging bottom surface) of the light guide 118; and different color portions of the illumination light can be (not required) incident onto different side facets of the trapezoidal light guide. The illumination light passing through the side facet(s) of the light guide is directed to the HOE (116) that further directs the illumination light onto the pixels of light valve 120. The light guide can be incorporated therewith other optical features, such as optical element 122 that can be used for beam shaping.

Because a holographic optical element is generally specific to certain wavelength ranges (e.g. red, green, or blue light), multiple holographic optical elements can be provided for light of different colors; and the multiple holographic optical elements can be stacked or disposed in any appropriate ways, as set forth in US 20070058143 to Penn, filed Sep. 13, 2005 and US 20060279816 to Duncan filed Jun. 9, 2005, the subject matter of each being incorporated by reference herein in its entirety. In general, designs of the light guide and/or other non-holographic optical elements for directing the light onto the holographic optical element are based on specific applications, performance and cost requirements, and other factors.

Regardless of different configurations of the HOE and light guide, directing the illumination light of the imaging system to the holographic optical element can be accomplished by many ways. For example, it can be accomplished through refraction of the illumination light from the light guide surface on which the illumination light is incident thereto. It can also be accomplished through a TIR (total-internal-reflection), or through a reflecting surface (e.g. a reflective mirror or a dichromatic surface), which can be a patterned mirror on a light transmissive substrate (e.g. glass) and a mirror on an edge of the light guide. When a non-holographic lens or a light guide is used, it is preferred (though not required) that the non-holographic lens or a light guide has a refraction index that matches the refraction index of the holographic optical element.

In the example as shown in FIG. 3, light guide 118 is a trapezoidal light guide composed of a light transmissive material that can be organic or inorganic, such as polymers, glass, quartz or any other suitable materials. Illumination light of the imaging system can be incident through a surface of the trapezoidal light guide, through the surface of which the incident illumination light is directed to the holographic optical element with a desired incident angle. In the presence of multiple colors of illumination light, illumination light of different colors (wavelengths) can be incident to different sides of the trapezoidal light guide, though not required. In other examples, illumination light of different colors can be incident onto the same side of the trapezoidal light guide. As discussed above, in some examples, the light guide (118) may not be necessary.

Light valve 120 comprises an array of individually addressable pixels, the total number of which is referred to as the resolution of the light valve. Depending upon different applications, the light valve may have any suitable resolutions. For example, the light valve may have a resolution of 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher. Of course, other resolutions are also applicable.

In one example, the light valve assembly (104) comprises a single light valve that is designated for processing (e.g. modulating) the illumination light of different colors (wavelengths), such as red, green, blue, yellow, cyan, magenta, white, and any other color light. In other examples, multiple light valves can be disposed in the light valve assembly (104). For example, multiple light valves for modulating incident light of different colors (wavelengths) can be attached to the bottom surface of the light guide (118). Accordingly, light guide, incident light of different colors, the HOE(s), and the multiple light valves can be arranged such that incident light of different colors are directed to corresponding light valves with desired profiles. It is noted that when multiple light valves are included in the light valve assembly, the multiple light valves may or may not be the same nature. A micromirror-based spatial light modulator and a LCD panel can be included in the light valve assembly. In other examples, a combination of any suitable light valves of different natures and/or different resolutions can be included in the light valve assembly.

The light valve assembly 104 may have different configurations depending upon the specific holographic optical element and other factors, such as non-holographic optical elements thereof. As an example, FIG. 4a schematically illustrates a light valve assembly.

Figure 4A:
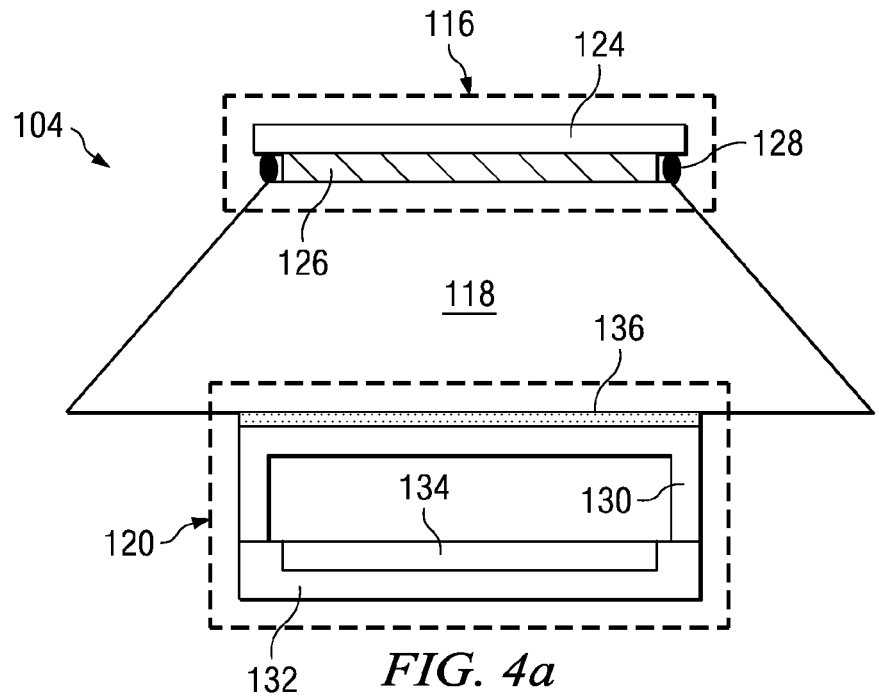
FIG. 4a schematically illustrates an exemplary light valve assembly.

Referring to FIG. 4a, light valve assembly 104 comprises holographic optical element 116, light guide 118, and packaged light valve 120. The holographic optical element (116) in this example comprises a light transmissive substrate 124 that is bonded to the top surface of trapezoidal light guide 118 using a bonding material (128). A selected holographic material 126 with a diffractive grating (modulated index of refraction) is disposed between light transmissive substrate 124 and the top surface of light guide 118. The bottom surface of the trapezoidal light guide is attached to (e.g. bonded to) the top surface of packaged light valve 120 (e.g. the top surface of package frame 130) that comprises an array of pixels (e.g. reflective and deflectable micromirror devices) formed on semiconductor substrate 132.

The light transmissive substrate 124, which is preferably a thin substrate with a thickness of 5 mm or less, 2 mm or less, and more preferably from 5 mm to 0.1 mm, such as from 0.5 mm to 1 mm, can be of any suitable substrates, such as an organic or inorganic light transmissive substrate. Exemplary light transmissive substrates can be glass, quartz, sapphire, and polymeric substrates. The light transmissive substrate may have other features to improve the performance.

The light guide (118), which is a trapezoidal optics in the example, is provided for receiving and directing the illumination light of the imaging system onto the holographic optical element at proper angle(s). In one example, the trapezoidal optics is disposed such that the side facets are facing the illumination light for receiving the illumination light.

The selected holographic optical material (126) is laminated between the lower surface of the light transmissive substrate (124) and the top surface of the trapezoidal light guide such that there is substantially no air gap between the holographic optical material 126 and the lower surface of light transmissive substrate 124 or between the holographic optical material (126) and the top surface of trapezoidal light guide 118. This is of particular importance when the holographic optical element comprises an environment-sensitive material, such as DCG. For this and other reasons, bonding material 128, which can be an O-ring, can be provided to substantially fully surround the laminated holographic material so as to isolate the laminated holographic material from the environment. The bonding material can also be used for bonding (e.g. hermetic bonding) the lower surface of the light transmissive substrate (124) and the top surface of the trapezoidal light guide, as illustrated in FIG. 4a. In one example, the holographic material with a diffractive grating is disposed within the gap formed by the light transmissive substrate (124), the trapezoidal light guide (118), and the bonding material such that there is substantially no air inside the gap. In other examples wherein the gap between the lower surface of the light transmissive substrate and the top surface of the trapezoidal optics is not substantially fully filled with the holographic optical element and the sealing material, leaving an empty space therein, such empty space can be filled with a protective material, preferably a material having a refractive index matching the refractive index of the a diffractive grating in the holographic material.

The bonding material (128) can be any suitable materials and in any suitable forms. For example, the bonding material can be a rigid object, such as a spacer substrate. In this instance, the spacer may be bonded to the lower surface of the light transmissive substrate, and/or bonded to the top surface of the trapezoidal light guide with the bonding can be hermetic or non-hermetic. The bonding can be accomplished by using any suitable bonding materials, such as epoxy and glass frit. Alternatively, the bonding material (128) can be a mechanically compliant material, such as epoxy, glue and a large variety of materials. In other alternative examples, an optical property enhancing layer can be disposed at the interface between the holographic material and the top surface of the trapezoidal light guide.

The light valve package (120) having a light valve is assembled with the optical assembly. In one example, the light valve package is attached to the bottom surface of trapezoidal optics as illustrated in FIG. 4a. In this example, the light valve comprises an array of individually addressable pixels 134 formed on semiconductor substrate 132 that can be a silicon substrate. The pixel array (134) and the semiconductor substrate 132, as well as other features, such as addressing electrodes formed on the semiconductor substrate (132) together form a light valve.

The light valve is packaged using package frame 130. For allowing transmission of the illumination light from the holographic optical element (116), the top portion facing the holographic optical element is preferably transmissive to the illumination light, or at least comprises an inlay window that is transmissive to the illumination light. The top surface of the package frame (130) can be bonded to the bottom surface of the trapezoidal optics, as shown in the figure. Bonding of the package frame 130 to the light guide (118) may depend on the optical path in the light guide. Specifically, the light valve and the package frame can be assembled such that the incoming illumination light can be refracted directly to the grating (modulated index of refraction) of the holographic element or can be refracted to the base of the light guide and subsequently reflected to the grating from the base. In the later example, TIR condition can be used at the base of the light guide. The TIR condition addresses that the index of refraction of the light guide (especially the base portion) is larger than the index of refraction of the ambient in contact with the light guide base surface, in which case, an air gap can be used. For example, an air gap can be provided between the bottom surface of the light guide and the top surface of the package frame. For improving the transmission of the illumination light, the top surface, or the inlay window of the top surface of the package frame (130) can be disposed thereon an optical layer, such as an anti-reflection layer (136). It is noted that when the light guide is joined (bonded) to the light transmissive portion of the package frame by an optical index matching adhesive material, an anti-reflection coating may not be necessary.

Figure 4B:
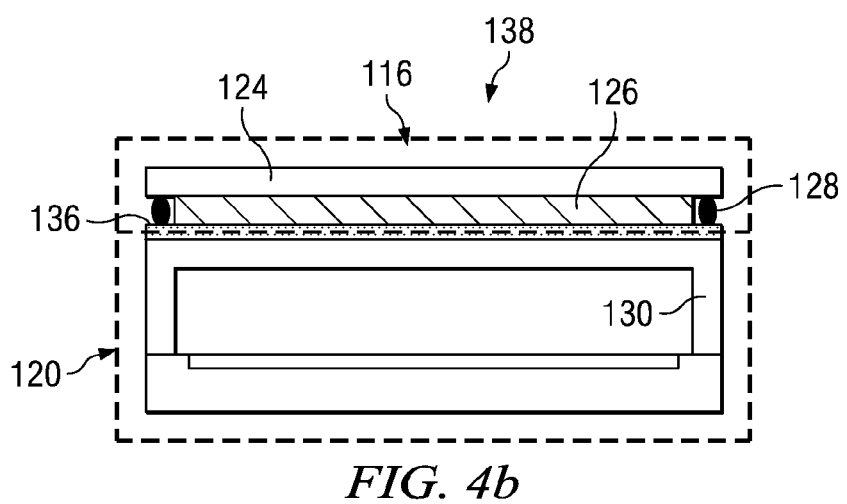
FIG. 4b schematically illustrates another exemplary light valve assembly.

In some examples wherein the trapezoidal light guide as discussed above with reference to FIG. 4a may not be necessary in the light valve assembly, an exemplary of which is schematically illustrated in FIG. 4b. Referring to FIG. 4b, light valve assembly 138 in this example does not have a light guide. The holographic material (126) with a diffractive grating is laminated between the lower surface of light transmissive substrate 124 and the top surface of package frame 130.

Similar to that in FIG. 4a, the holographic material with a diffractive grating can be disposed within a gap between the light transmissive substrate and the top surface of the package frame with substantially no air gap between the holographic material and the lower surface of the light transmissive substrate and/or between the holographic material and the top surface of the package frame. The laminated holographic material can be isolated from the environment by the bonding material, which can further be used as a bonding material. As an alternative feature, an optical property enhancing layer, such as an anti-reflection coating layer 136 can be disposed at the interface of the top surface of the package frame and the holographic material. It is noted that when the light guide is joined (bonded) to the light transmissive portion of the package frame by an optical index matching adhesive material, an anti-reflection coating may not be necessary.

Figure 5A:
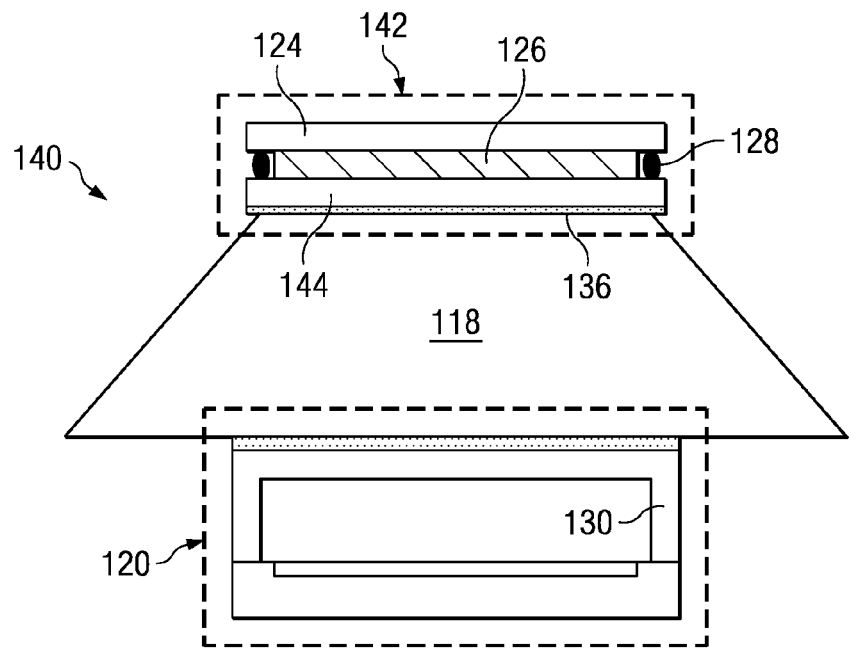
FIG. 5a schematically illustrates yet another exemplary light valve assembly.

Another exemplary light valve assembly (140) is schematically illustrated in FIG. 5a As compared to that in FIG. 4a, the holographic material (126) with a diffractive grating is laminated between two light transmissive substrates—light transmissive substrates 124 and 144. For isolating the holographic optical element from the environment when necessary, a bonding material is disposed between the light transmissive substrates and substantially surrounds the holographic material 126; while the bonding material can further be used as a bonding material for bonding the two light transmissive substrates. Light transmissive substrate 144 may or may not have the same material, shape, or thickness as light transmissive substrate 124. For improved optical performance of the holographic optical element (116), light transmissive substrate 144 preferably, though not required, has an optical refractive index that matches the optical refractive index of the grating structure in holographic material 126. The holographic optical element (116) is attached to trapezoidal light guide 118 by attaching (e.g. bonding) the bottom surface of light transmissive substrate 144 to the top surface of trapezoidal light guide 118. The bottom surface of the trapezoidal light guide is attached to, such as by bonding, the top surface of the package frame (130) of the packaged light valve 120. In other examples when necessary, an optical enhancing layer, such as anti-reflection layers, can be provided, for example, on the top surface of the package frame. It is noted that when the light guide is joined (bonded) to the light transmissive portion of the package frame by an optical index matching adhesive material, an anti-reflection coating may not be necessary.

Figure 5B:
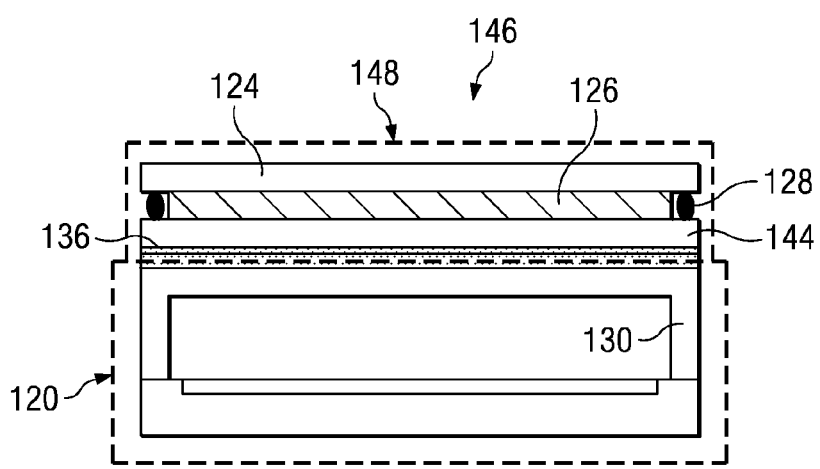
FIG. 5b schematically illustrates yet another exemplary light valve assembly.

As an alternative to the configuration of the light valve assembly illustrated in FIG. 5a, FIG. 5b schematically illustrates an exemplary light valve assembly (146) wherein the trapezoidal light guide (118) in the light valve assembly illustrated in FIG. 5a is absent. In this example as shown in FIG. 5b, the lower surface of light transmissive substrate 144 is directly attached to the top surface of the package frame (130). As an alternative feature, an anti-reflection coating layer can be provided at the interface between the light transmissive substrate (144) and package frame 130.

Figure 6:
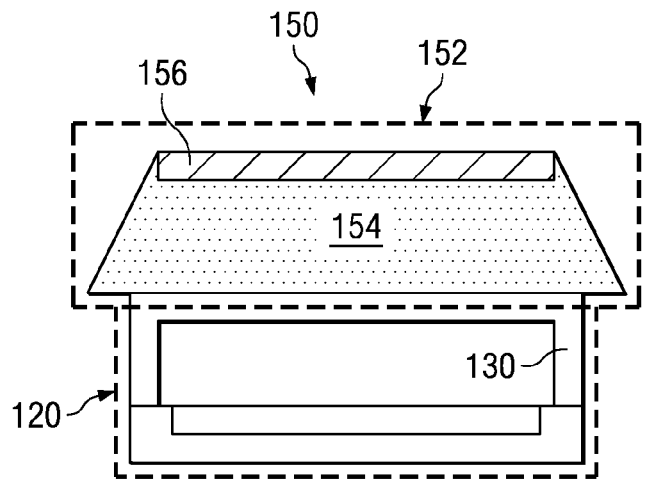
FIG. 6 schematically illustrates yet another exemplary light valve assembly.

Another exemplary light valve assembly is schematically illustrated in FIG. 6. Referring to FIG. 6, light valve assembly 150 comprises holographic optical element 152 that comprises holographic material 154. The holographic material (154) is preferably, though not required, a photosensitive material, such as a photosensitive glass with diffractive grating 156. The diffractive pattern 156 can be a specific diffractive grating or other suitable diffractive patterns capable of reforming the illumination light incident thereto into diffracted light, wherein the diffracted light can have an illumination field with a desired profile at the location of the pixels of the light valve in the packaged light valve 120. Specifically, the diffracted light at the location of the pixels (e.g. reflective and deflectable micromirror devices) of the light valve may have a uniformly distributed intensity across the pixel area of the light valve; and/or a shape (e.g. rectangular shape) matching the shape of the pixel area of the light valve (e.g. rectangular shape). In this particular example illustrated in FIG. 6, holographic material 154 takes a trapezoidal shape (acting as a light guide for directing the light to the grating) with side facets facing the illumination light of the imaging system for receiving the illumination light and directing the received illumination light onto the embedded diffractive pattern (156) at a proper angle(s). The trapezoidal shaped holographic material (154) is assembled to the packaged light valve 120; and can be assembled by bonding the bottom surface of the trapezoidal shaped holographic material (154) to the top surface of the package frame (130) of the packaged light valve (120) as illustrated in FIG. 6. In other examples, non-holographic optical elements and/or other holographic optical elements can be assembled to or attached to the trapezoidal holographic material 154 for desired purposes, such as reshaping and adjusting the propagation path of the incident illumination light.

Figure 7A:
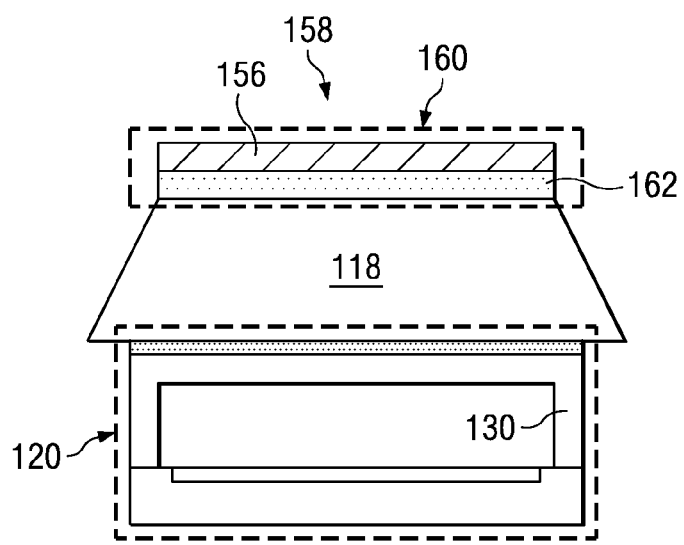
FIG. 7a schematically illustrates yet another exemplary light valve assembly.

As an alternative to the configuration of the light valve assembly illustrated in FIG. 6, the holographic optical element can be attached to a non-holographic light guide, such as a trapezoidal light guide, as schematically illustrated in FIG. 7a. Referring to FIG. 7a, light valve assembly 158 comprises holographic optical element 160 that is attached to the top surface of trapezoidal light guide 118; and packaged light valve 120 is attached to the bottom surface of the trapezoidal light guide through package frame 130.

The holographic optical element (160) in this example comprises holographic material 156 embedded therein a specific diffractive grating 162. The holographic material (156) and the diffractive grating (162) can be the same as those of holographic optical element 152 as discussed above with reference to FIG. 6 except that the holographic material (156) is not patterned into a trapezoidal light guide. The holographic material (162) in this example is a substantially flat substrate with a rectangular shape or any other suitable shapes, preferably matching the shape of the top surface of the trapezoidal light guide (118). The trapezoidal light guide (118) can be the same as that of the light valve assembly illustrated in FIG. 5a. The holographic material (162) is directly attached to, for example by bonding to, the top surface of trapezoidal light guide 118. Because the holographic optical material may not be isolated from the environment, this configuration is more suitable for holographic optical elements that are more resistant to environmental variations, such as photosensitive holographic materials.

Figure 7B:
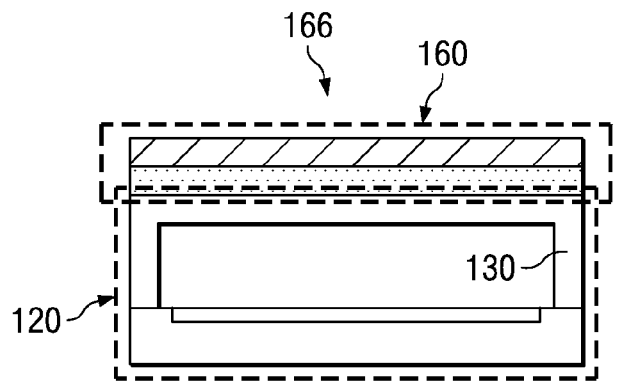
FIG. 7b schematically illustrates yet another exemplary light valve assembly.

As an alternative configuration to the light valve assembly in FIG. 7a, the holographic optical element (160) as shown in FIG. 7a can be directly attached to, for example by bonding to the top surface of the package frame (130) to form a light valve assembly (166), as schematically illustrated in FIG. 7b. In this example, the holographic optical element can be attached to the top surface of the package frame such that there is substantially no air gap between the holographic optical element and the attached top surface of the package frame. Other non-holographic and/or other holographic components can also be provided to the light valve assembly for desired purposes, such as re-shaping and adjusting the propagation path of the illumination light traveling into and/or within the light valve assembly.

The light valve assemblies as discussed above, as well as many other variations thereof, each can be fabricated in many ways. As a way of example, FIG. 8a through FIG. 8e illustrate a method of making the light valve assembly as discussed above with reference to FIG. 4a.

Figure 8A:
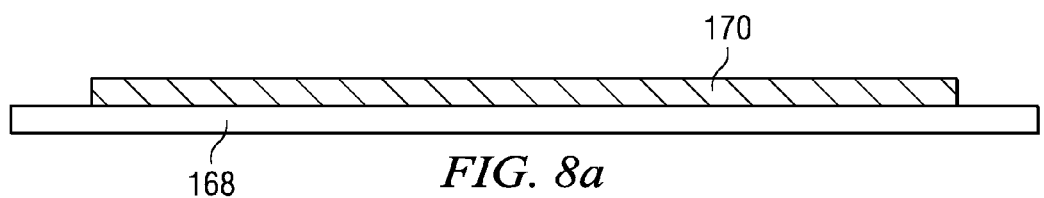
FIG. 8a through FIG. 8e schematically illustrate an exemplary method of making a light valve assembly.

Referring to FIG. 8a, layer 170 of a holographic material, such as DCG or any other suitable materials is formed or disposed on light transmissive wafer 168 that can be composed of the same material as the light transmissive substrate 124 as discussed above with reference to FIG. 4a. If the layer of holographic material 170 deposited on wafer 168 does not have a desired grating with a specific diffractive structure, the layer of the holographic material can be processed to form the desired grating with the specific diffractive structure.

Figure 8B:
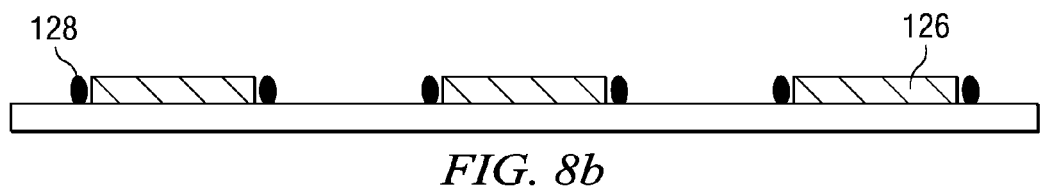

The holographic material layer (170) is then patterned into holographic optical elements, such as element 126 on the light transmissive wafer followed by disposing a bonding material (128) around the patterned holographic optical elements, as schematically illustrated in FIG. 8b.

Figure 8C:
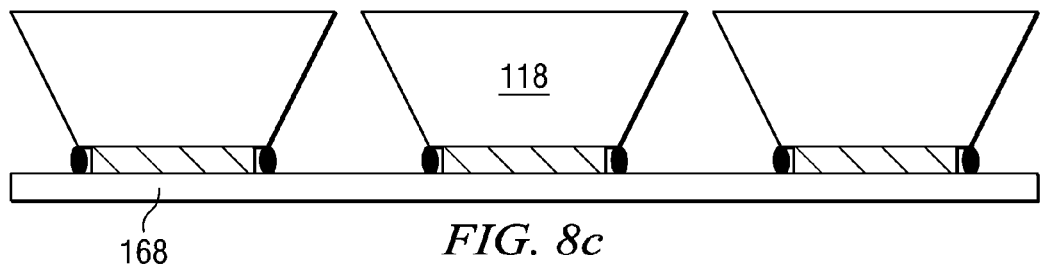

A light guide, such as trapezoidal light guide 118, is mounted on each holographic optical element appropriately through, for example pick-and-place as shown in FIG. 8c. In one example, each trapezoidal light guide can be bonded to the holographic optical element such that there is substantially no air gap between the bonding surface (top surface) of the trapezoidal light guide and the holographic optical element. The bonding can be accomplished through the bonding material (128) disposed therebetween. When the holographic optical element is composed of an environment sensitive material, such as DCG, the bonding material can be used for isolating the holographic optical element from the environment, by for example, forming the bonding material as an O-ring; disposing the bonding material substantially fully surrounding the holographic optical element; and hermetically bonding the light transmissive wafer (168) to the trapezoidal light guide.

In examples wherein additional optical components, such as non-holographic optical elements, other holographic elements, optical filters, and any combinations thereof, are to be included in the trapezoidal light guide, such additional optical components can be assembled to the trapezoidal light guide before or after attaching trapezoidal light guide to the holographic optical element. Specifically, an anti-reflection layer can be disposed or formed on the top surface of the trapezoidal light guide before bonding the trapezoidal light guide to the holographic optical element.

Figure 8D:
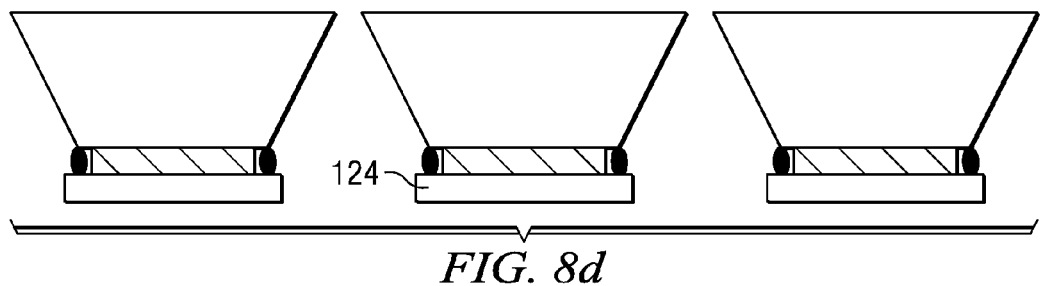

The trapezoidal light guide and the holographic optical element attached thereto on the light transmissive wafer can then be singulated to obtain individual optical assemblies. After singulation, light transmissive substrate 168 is processed into light transmissive substrates, such as substrate 124, of singulated holographic optical element as illustrated in FIG. 8d.

Figure 8E:
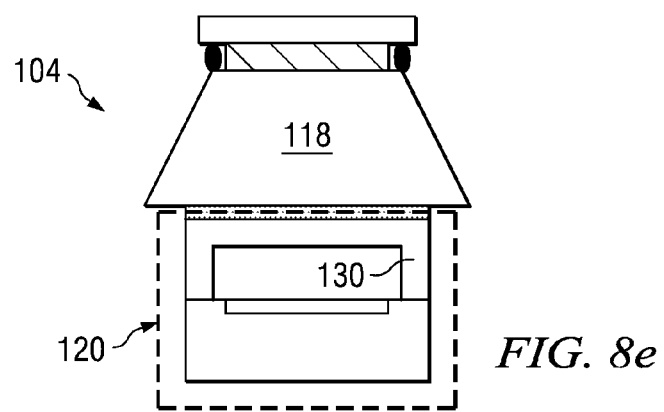

After singulation, each assembly comprising the holographic optical element and trapezoidal light guide attached thereto is assembled to a packaged light valve (e.g. packaged light valve 120) by bonding the top surface of the package frame (e.g. package frame 130) of the packaged light valve to the bottom surface of the trapezoidal light guide so as to form a light valve assembly (e.g. 104), as schematically illustrated in FIG. 8e.

The packaged light valve can be fabricated in many ways depending upon the specific structure of the pixels of the light valve. FIG. 9a through FIG. 9d schematically illustrate an exemplary method for making a packaged light valve having pixels of deflectable and reflective micromirror devices.

Figure 9A:
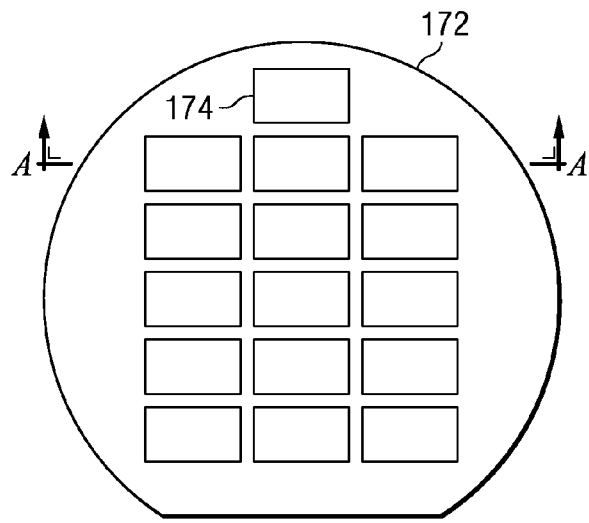
FIG. 9a through FIG. 9e schematically illustrate an exemplary method of packaging a light valve for a light valve assembly.

Referring to FIG. 9a, semiconductor wafer 172, which can be a silicon wafer or other suitable wafers on which electronic circuits can be formed, is provided. A plurality of die areas, such as die area 174, is formed on the semiconductor wafer. In each die area, such as die area 174, an array of micromirrors (134) is formed, as schematically illustrated in FIG. 9b, wherein a cross-sectional view along line AA in FIG. 9a is schematically illustrated therein.

Figure 9B:
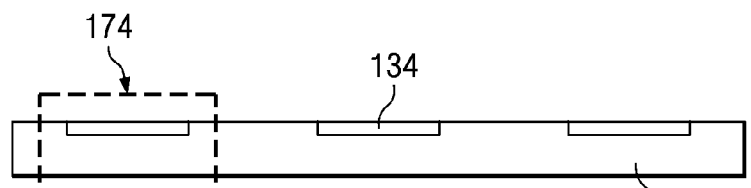
Figure 9C:
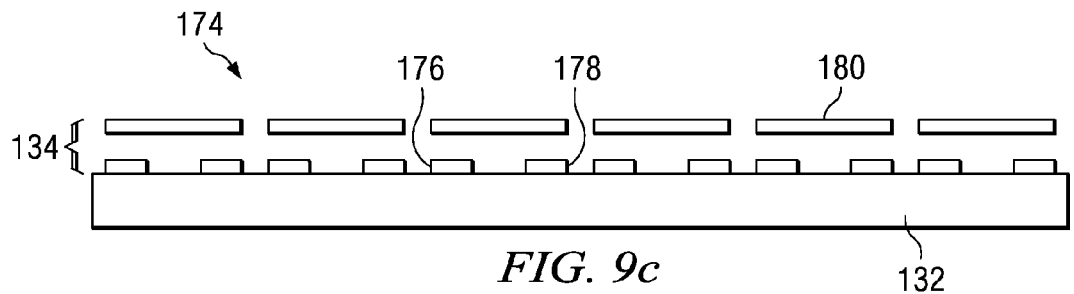

FIG. 9c schematically illustrates a cross-sectional view of an array of micromirrors (134) in die area 174 on substrate 132 that is a portion of wafer 172 as illustrated in FIG. 9b. In this example, each micromirror comprises a pair of addressing electrodes, such as addressing electrodes 176 and 178; an electronic circuit connected to the addressing electrodes for controlling electronic states of the addressing electrodes (which is not shown for simplicity); and a deflectable and reflective mirror plate 180. The addressing electrode pair is disposed at a location approximate to the mirror plate such that electrostatic fields can be established between the addressing electrodes and the mirror plate for electrostatically deflecting the mirror plate. The mirror plates can be formed on the semiconductor substrate (132), or alternatively be formed on a light transmissive substrate, such as glass, quartz, sapphire, and any other suitable light transmissive substrates. Exemplary method for making the micromirrors can be found in U.S. Pat No. 4,662,746 issued on May 1987, U.S. Pat. No. 5,216,537 issued on June 1993, U.S. Pat. No. 5,535,047 issued on July 1996, and U.S. Pat. No. 6,046,840 issued on Apr. 4, 2000, U.S. Pat. No. 6,947,200 issued Sep. 20, 2005, the subject matter of each being incorporated herein by reference in its entirety.

Figure 9D:
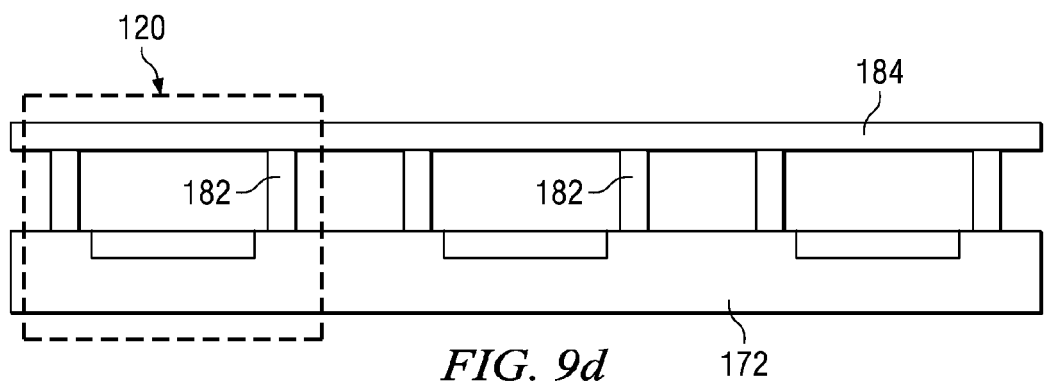

After forming the micromirrors on the semiconductor wafer, a packaging step can be carried out on the wafer level by enclosing each micromirror within a package. In the example as illustrated in FIG. 9*d*, package wafer 184 is placed on top of the micromirror arrays on semiconductor wafer 172 with package frames (e.g. package frame 182) disposed around the micromirror arrays. As a result, each micromirror array can be encapsulated (fully or partially) within a space surrounded by the package wafer (184), a package frame (e.g. 182), and the semiconductor wafer (172). For allowing the illumination light to illuminate the reflective surfaces of the micromirrors through the package wafer, the package wafer can be a wafer that is transmissive to the illumination light, such as the visible light. Alternatively, the package wafer can be a non-transmissive wafer but having at least a transmissive portion, such as an inlay window transmissive to the illumination light, at a location corresponding to the underneath micromirrors of each micromirror array such that substantially all incident illumination light and the modulated light can pass through the transmissive portions.

Figure 9E:
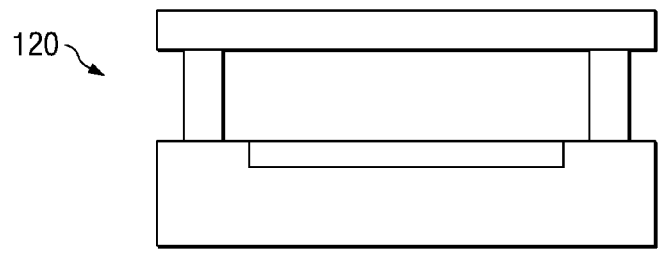

The packaged light valves on wafer 172 can then be singulated to obtain individual packaged light valves. An example of the singulated packaged light valve (120) is schematically illustrated in FIG. 9*e*.

Other than packaging the micromirrors on the wafer level, the packaging can alternatively be conducted on the die level (i.e. on each individual dies). For example, after forming the micromirrors on the semiconductor wafer as illustrated in FIG. 9*b*, the formed micromirror array in each die area on semiconductor wafer 172 can be singulated from the semiconductor wafer so as to obtain individual micromirror arrays. The obtained individual micromirror arrays each can then be packaged separately by enclosing the micromirror arrays between a package substrate that can be a portion of package wafer 184, a package frame (e.g. package frame 182), and the semiconductor substrate that is a portion separated from the semiconductor wafer (172).

Figure 10A:
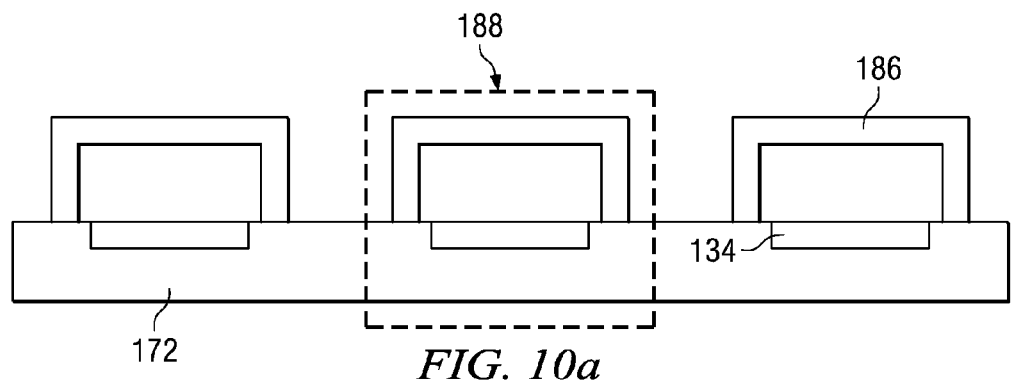
FIG. 10a and FIG. 10b schematically illustrate another exemplary method of packaging a light valve for a light valve assembly.
Figure 10B:
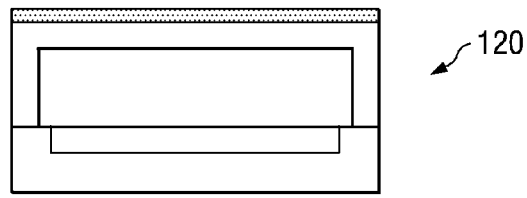
Figure 11:
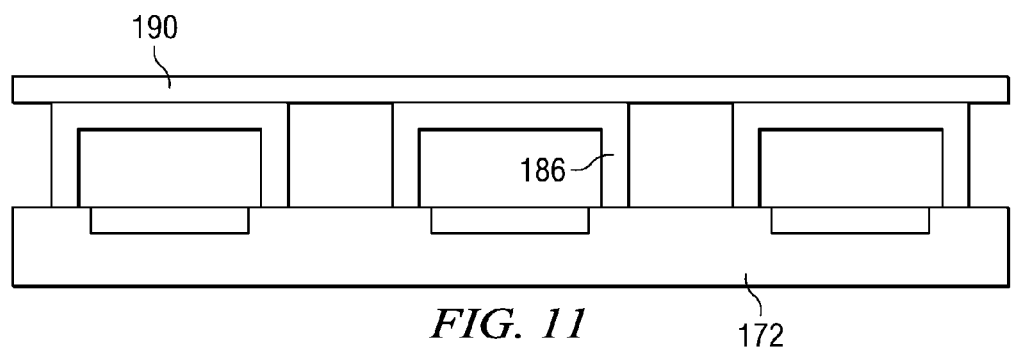
FIG. 11 schematically illustrates yet another exemplary method of packaging a light valve for a light valve assembly on the wafer level.

FIG. 10*a* and FIG. 10*b* schematically illustrate another exemplary method of making a packaged light valve 188. Referring to FIG. 10*a*, a set of separate package covers, such as package cover 186, is employed for packaging the light valves. Each package cap, such as package cap 186, comprises a cavity formed by a package frame portion and a substantially flat top portion. The package caps can be composed of a light transmissive material, which can be inorganic or organic. For example, the package cap can be glass, quartz, sapphire, and may other suitable light transmissive materials. In particular, the package cap can be a plastic or a polymer that is transmissive to the illumination light, such as visible light, of the imaging system. Using a plastic, polymer, or any other similar materials for the package cap is of more important in simplifying the fabrication of the package caps. Specifically, a plastic, polymer or other similar materials can be molded to form the desired package cap with the cavity. An example of the packaged spatial light modulator after singulation is schematically illustrated in FIG. 10*b*. As an alternative feature, an optical enhancing layer, such as an anti-reflection layer, can be disposed on the top portion of the package cap, as illustrated in FIG. 10*b*.

Other than individually disposing package caps on the micromirrors formed on the semiconductor wafer as discussed above with reference to FIG. 10*a* and FIG. 10*b*, the package caps can be placed on a carrier substrate (190) such that multiple package caps can be placed at a time. After placing the multiple package caps at the locations of the micromirror arrays, the carrier substrate can then be removed.

Figure 12:
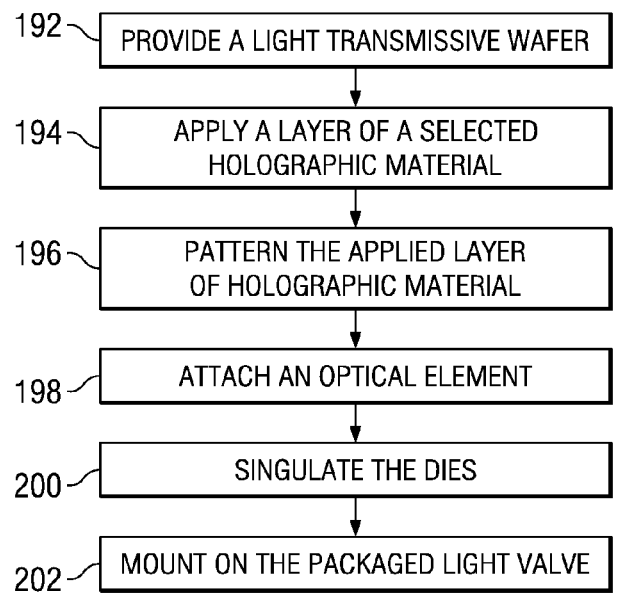

The fabrication method as discussed above with reference to FIG. 8*a* through 8*e* can be illustrated in the flow chart in FIG. 12. Referring to FIG. 12, a light transmissive wafer, such as wafer 168 in FIG. 8*a*, is provided (step 192) followed by application of a layer of a selected holographic material (step 194), such as holographic material 170 in FIG. 8*a*. The layer of holographic material is then patterned so as to form holographic material segments each of which corresponds to holographic material 126 in FIG. 4*a* and FIG. 8*b* (step 196). During the patterning step, desired diffraction patterns can be formed on the applied holographic material if the applied holographic material before the patterning does not have the desired diffractive pattern. The holographic material can be segmented. Of course, the step of patterning the applied holographic material and the step of segmenting the holographic material can be performed in any suitable orders. If the applied holographic material already comprises desired diffractive patterns, the above patterning for diffractive patterns on the holographic material can be omitted.

The patterned holographic material segments (e.g. 126) are then attached to light guides, such as trapezoidal light guide 118 in FIG. 8*c* (step 198). The light transmissive wafer (step 200) can then be singulated into portions with each portion have a holographic material segment (126) and a trapezoidal light guide attached thereto followed by assembling with a packaged light valve (step 202).

Figure 13A:
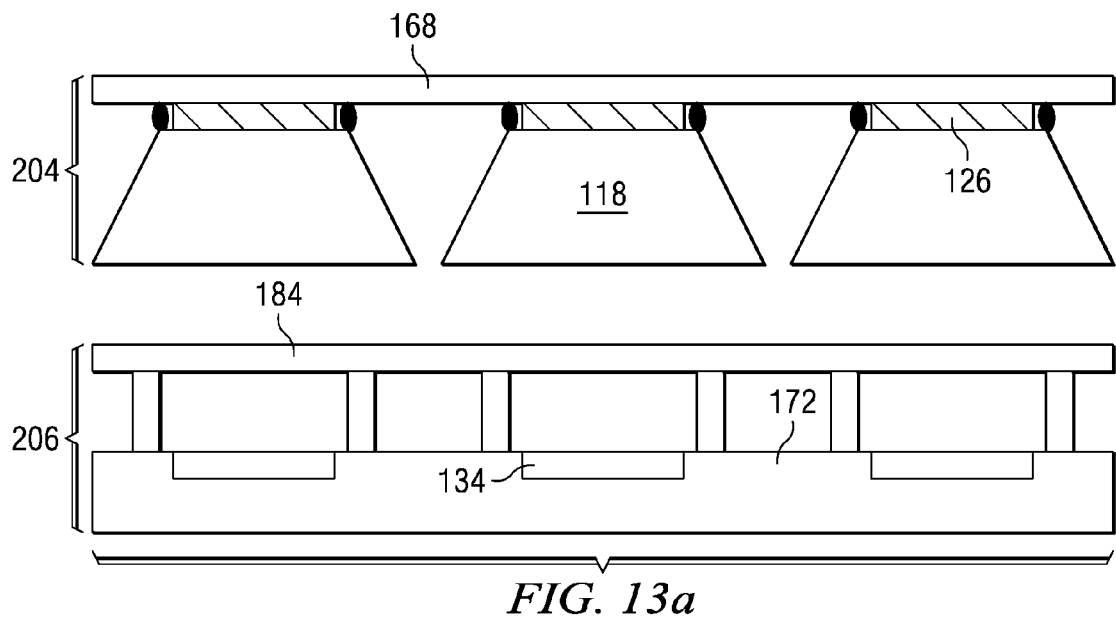
FIG. 13a and FIG. 13b schematically illustrate another exemplary method of making a light valve assembly illustrated in FIG. 4a on the wafer level.
Figure 13B:
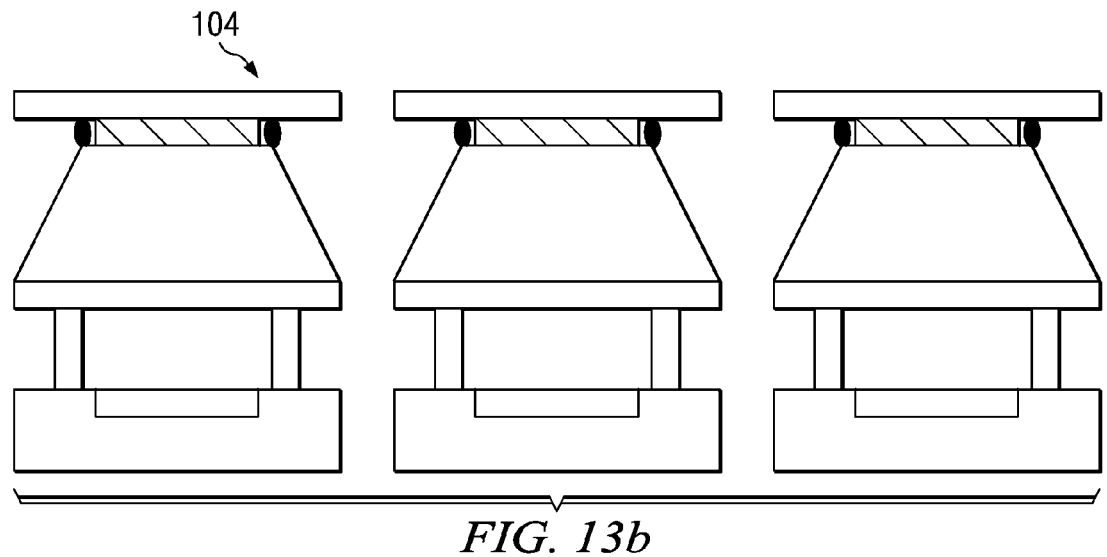

The light valve assembly as discussed above with reference to FIG. 8*a* through FIG. 8*e* can be fabricated on different wafer-levels, one of which is schematically illustrated in FIG. 13*a* and FIG. 13*b*.

Referring to FIG. 13*a*, optical assembly wafer 204 comprises light transmissive wafer 168 on which a set of holographic material segments, such as holographic material segment 126, is formed. The holographic material segments can be formed by the same method as discussed above with reference to FIG. 8*b*, which will not be repeated herein. Trapezoidal light guides (e.g. 118) are attached to the holographic material segments (e.g. 126) by bonding each trapezoidal light guide to the light transmissive wafer (168) such that the top surface of each trapezoidal light guide is bonded to the bottom surface of the light transmissive substrate with a holographic material segment disposed therebetween.

Packaged light valve wafer 206 comprises a plurality of packaged micromirrors as discussed above with reference to FIG. 9*d*. Wafers 204 and 206 can be aligned and assembled together by bonding the package wafer 184 to the bottom surfaces of trapezoidal light guides so as to form a wafer assembly. In the wafer assembly, each holographic material segment (e.g. 126), trapezoidal light guide (e.g. 118), and the micromirror array (e.g. 134) formed on semiconductor wafer 172 are properly aligned together as discussed above with reference to FIG. 4*a*.

The wafer assembly can then be singulated to obtain individual light valve assemblies (e.g. light valve assembly 104), as illustrated in FIG. 13*b*. It is noted that the singulation includes singulation of both wafers 172 and 168; and the singulation for different wafers may be performed at the same time, or may be performed separately.

Figure 14:
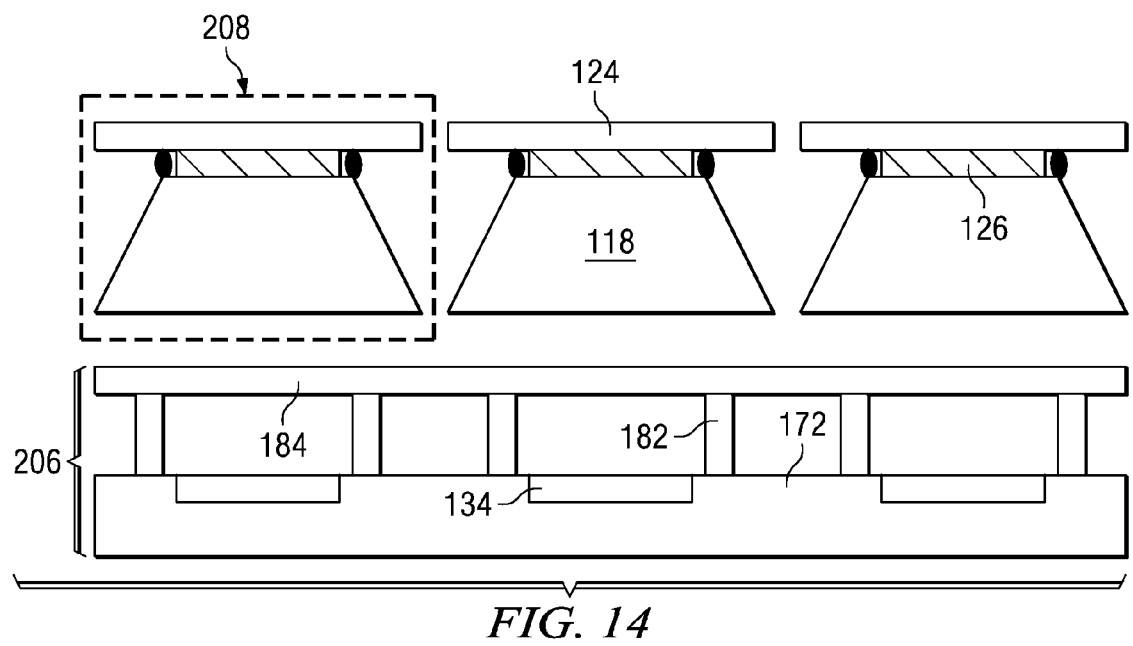
FIG. 14 schematically illustrates yet another exemplary method of making a light valve assembly illustrated in FIG. 4a on the wafer level.

As an alternative method, the optical assemblies 204 on wafer 168 as illustrated in FIG. 13*a* can be singulated into individual optical assemblies followed by assembling of the individual optical assemblies to the packaged light valves on packaged light valve wafer 206, as illustrated in FIG. 14. For example, optical assemblies (e.g. optical assembly 208) each comprising a light transmissive substrate (e.g. 120), a holographic material (e.g. holographic material 126), and a trapezoidal light guide (e.g. 118) can be singulated from the light transmissive wafer (e.g. wafer 168 in FIG. 13*a*) on which the holographic material is applied. Light transmissive substrate 124 is a singulated segment from the light transmissive wafer (168).

The singulated optical assemblies each are aligned and assembled to a packaged light valve on packaged light valve wafer 206. The assembled optical assemblies and packaged light valves can then be singulated from wafer 206 so as to form individual light valve assemblies.

Figure 15:
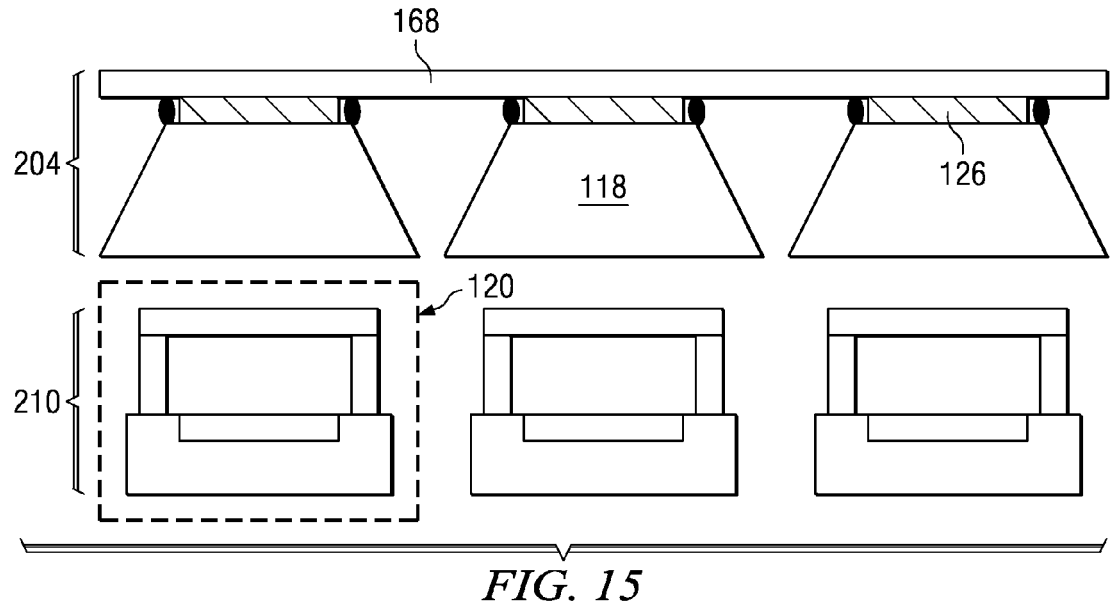
FIG. 15 schematically illustrates yet another exemplary method of making a light valve assembly illustrated in FIG. 4a on the wafer level.

As an alternative method to the methods discussed above with reference to FIG. 13*a* and FIG. 14, the light valve assemblies on the packaged light valve wafer (206) in FIG. 13*a* can be singulated from wafer 178 so as to obtain a set (210) of individual packaged light valves (e.g. 120), as schematically illustrated in FIG. 15. The singulated and packaged light valves can then be individually attached to the optical assemblies of optical assembly wafer 204 followed by singulation of the optical assemblies from wafer 168.

Figure 16A:
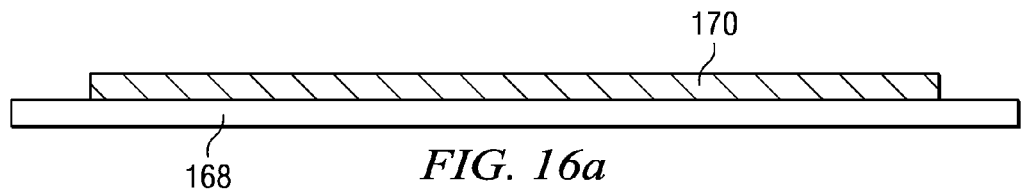
Figure 16B:
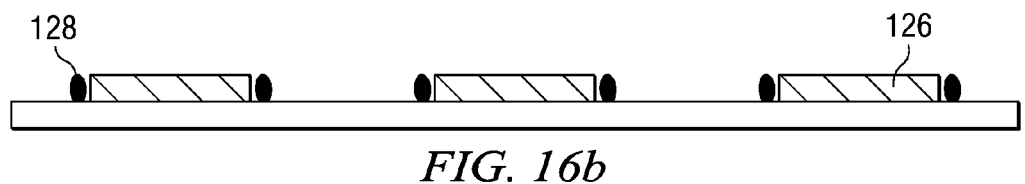

FIG. 16*a* through FIG. 16*e* schematically demonstrate an exemplary method of making a light valve assembly as discussed above with reference to FIG. 4*b*. FIG. 16*a* and FIG. 16*b* demonstrate a method of making holographic material segments (e.g. segment 126) on a light transmissive wafer (168), the method of which can be the same as that discussed above with reference to FIG. 8*a* and FIG. 8*b* and will not be repeated herein.

Figure 16C:
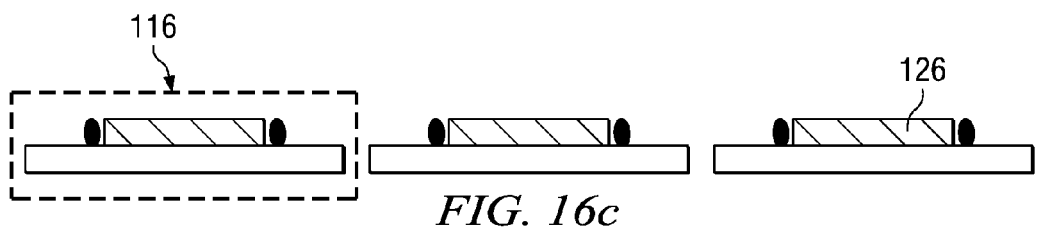

Individual optical elements (e.g. 116) each having a light transmissive substrate (a segment of wafer 168) and a holographic material segment (126) are obtained by singulating the holographic material segments from wafer 168 as illustrated in FIG. 16*c*.

The individual optical elements can then be assembled to packaged light valves (e.g. 120), one of which is illustrated in FIG. 16*d*, by attaching the holographic material segments directly to the top surface of the packaged light valve, as illustrated in FIG. 16*e* so as to form desired light valve assemblies (e.g. 138). The light valve assembly illustrated in FIG. 4*b* can alternatively be fabricated on a wafer level, as will be discussed below with reference to FIG. 17*a* and FIG. 17*b*.

Referring to FIG. 17*a*, a HOE wafer (210) having multiple holographic material segments (e.g. 126) formed on a light transmissive wafer 168 can be formed by the same method as discussed above with reference to FIG. 8*a* and FIG. 8*b*. Packaged light valve wafer 206 can be formed by the same method as discussed above with reference to FIG. 9*a* through FIG. 9*e*. The HOE wafer (210) and the packaged light valve wafer (206) are assembled together to form a wafer assembly, as illustrated in FIG. 17*b*. In the wafer assembly, the holographic material segments are directly attached to the top surface of the packaged light valves; and each is properly aligned to an array of micromirrors in the packaged light valve. The wafer assembly can then be singulated so as to form individual light valve assemblies (e.g. 138), one of which is schematically illustrated in FIG. 17*c*.

Figure 18A:
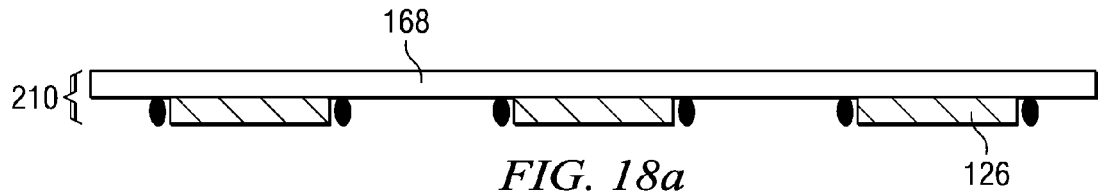
FIG. 18a through FIG. 18e schematically illustrate another exemplary method of making a light valve assembly in FIG. 4b on a wafer level.
Figure 18B:
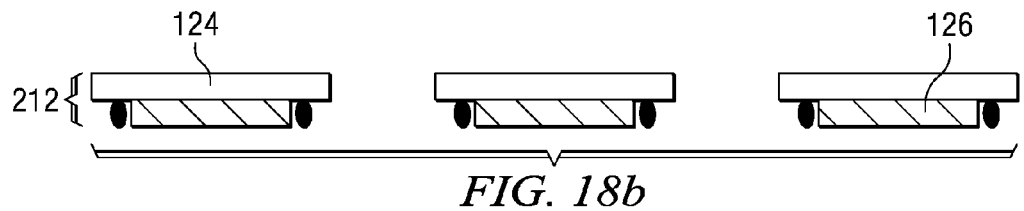

As yet another example, the light valve assembly illustrated in FIG. 4*b* can be formed on another wafer level, as demonstrated in FIG. 18*a* through FIG. 18*e*. FIG. 18*a* demonstrates a method of making a HOE wafer (210) comprising multiple holographic material segments on wafer 168. The method can be the same as discussed above with reference to FIG. 17*a*, which will not be repeated herein. Wafer 210 is singulated so as to obtain a set of (212) individual holographic optical elements, each comprising a light transmissive substrate (a segment of wafer 168) and a holographic material (126) with desired grating.

Figure 18C:
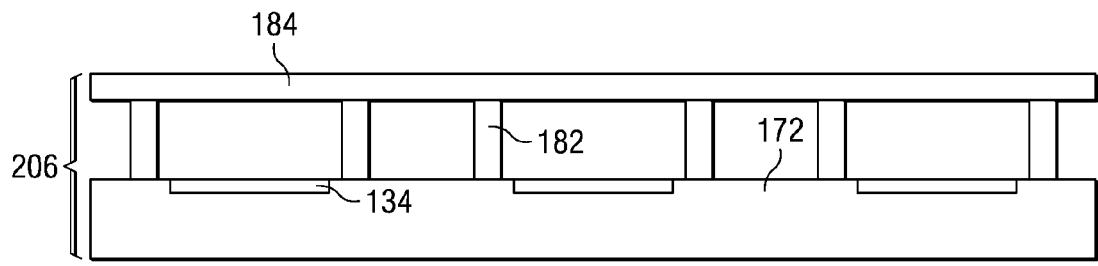
Figure 18D:
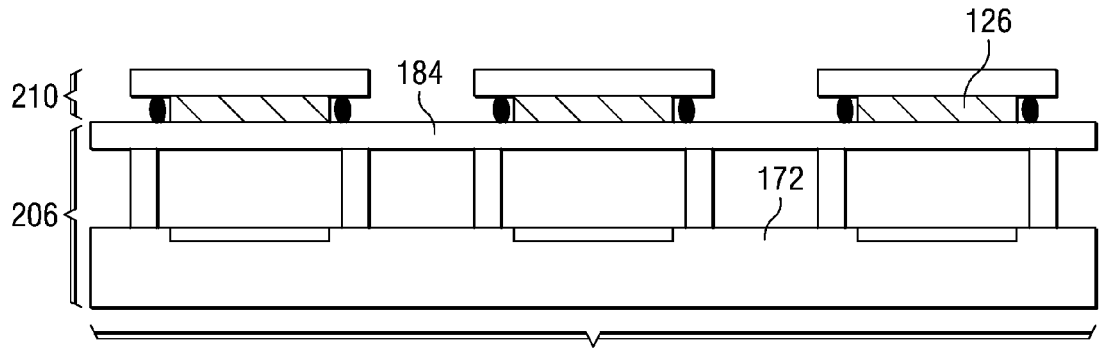
Figure 18E:
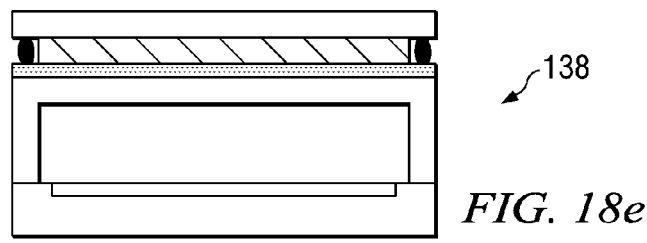

The separated holographic optical elements are assembled to the packaged light valves on packaged light valve wafer 206 that comprises a package wafer 184 and micromirror arrays (e.g. 134) formed on semiconductor wafer 172, as illustrated in FIG. 18*c*. The assembly of separated holographic optical elements and packaged light valves on wafer is schematically illustrated in FIG. 18*d*. The package wafer (184) and semiconductor wafer 172 can then be diced so as to obtain individual light valve assemblies, one of which is schematically illustrated in FIG. 18*e*.

Other than assembling individual holographic elements on the packaged light valve wafer (206) followed by singulating the packaged light valve wafer to obtain individual light valve assemblies, light valve assemblies can be obtained by assembling individual packaged light valves to holographic optical elements on a wafer followed by singulating the holographic optical element wafer, as illustrated in FIG. 19*a* through FIG. 19*e*.

Figure 19A:
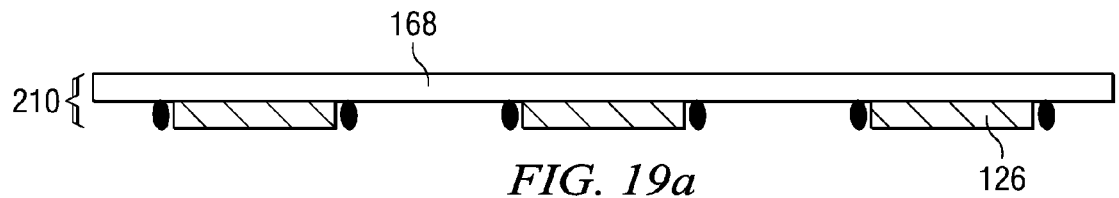
FIG. 19a through FIG. 19e schematically illustrate yet another exemplary method of making a light valve assembly in FIG. 4b on a wafer level.
Figure 19B:
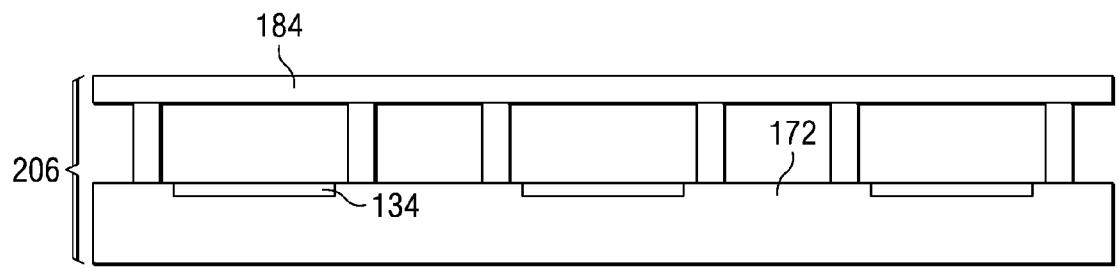
Figure 19C:
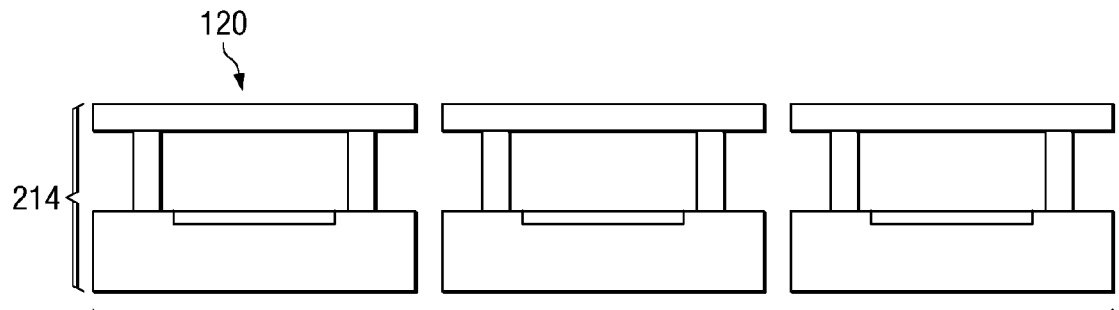
Figure 19D:
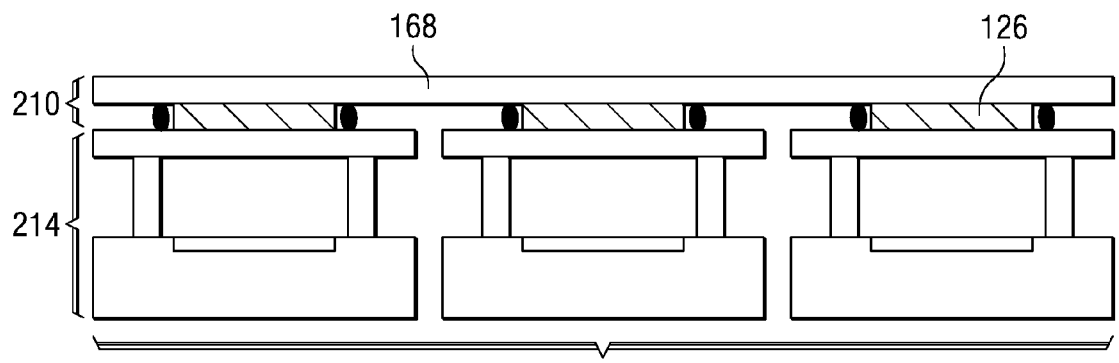
Figure 19E:
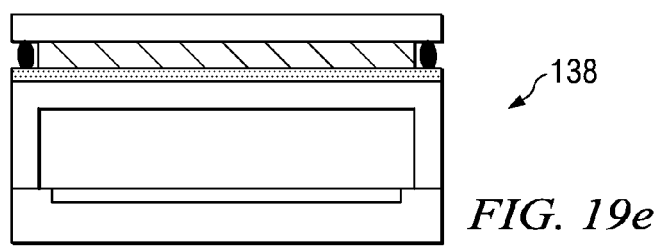

Referring to FIG. 19*a*, a HOE wafer (210) comprising light transmissive wafer 168 and holographic material segments 126 (each having a desired grating) formed on wafer 168 is provided. A packaged light valve wafer (206), as illustrated in FIG. 19*b*, comprising micromirror arrays (e.g. 134), package wafer 184, and semiconductor wafer 172 is provided. The packaged light valve wafer (206) can be singulated into a set of individual packaged light valves, such as 120 in the set of 214, as illustrated in FIG. 19*c*. The individual packaged light valves are assembled to the holographic wafer (210) by attaching the top surfaces of the packaged light valves to the holographic material segments, as illustrated in FIG. 19*d*. The light transmissive wafer 210 can then be diced so as to obtain individual light valve assemblies, such as light valve assembly 138 in FIG. 19*e*.

Figure 20A:
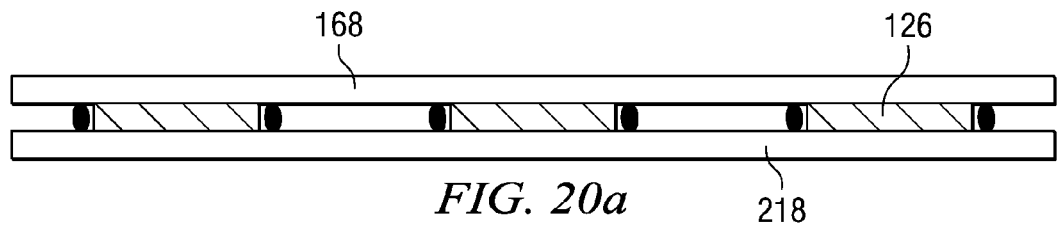
Figure 20B:
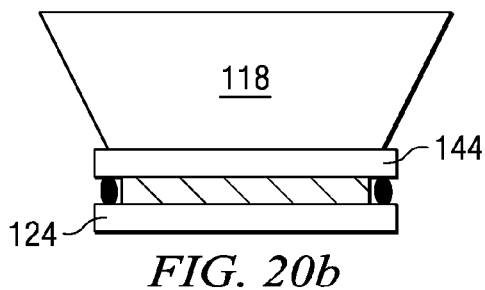
Figure 20C:
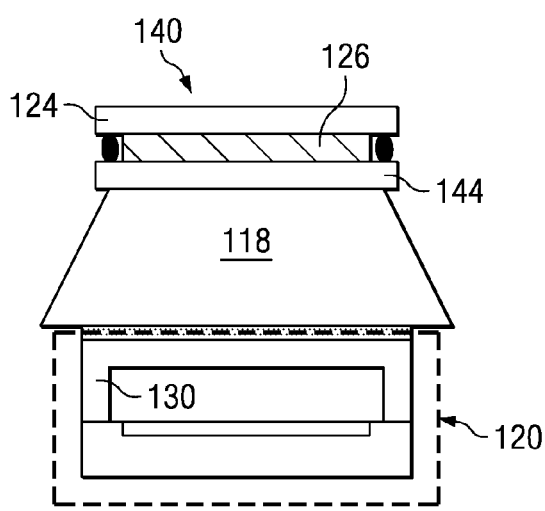

FIG. 20*a* through FIG. 20*c* schematically illustrate an exemplary method of making a light valve assembly as discussed above with reference to FIG. 5*a*. Referring to FIG. 20*a*, a HOE wafer laminate comprises light transmissive wafers 168 and 218 that are bonded together and form a space therebetween, and holographic material segments (e.g. 126) that are disposed within the space and laminated between wafers 168 and 218. The light transmissive wafers 168 and 218 are bonded by bonding materials. The bonding materials are also utilized for substantially fully sealing the holographic material segments so as to isolate the holographic material segments from the environment when needed. As discussed above with reference to FIG. 5*a*, the two light transmissive wafers may or may not have the save thickness; and may or may not comprise the same material. However, it is preferred, though not required that the light transmissive wafers have optical refractive indices matching the refractive index of the grating in the holographic material segments.

The holographic material segments can be obtained by applying a layer of a selected holographic material on either one of the light transmissive wafers followed by patterning the layer into holographic material segments. If the applied layer of the holographic material does not have the desired diffractive pattern (grating), a step of forming the desired diffractive pattern can be performed before or after the step of patterning the layer into holographic material segments.

After patterning the layer of the holographic material into holographic material segments (or after the step of forming the desired diffractive pattern, which is performed after the step of patterning the layer into holographic material segments), the other light transmissive wafer can be bonded to the light transmissive wafer on which the holographic material segments have been formed so as to form the HOE wafer assembly as illustrated in FIG. 20a.

Wafers 168 and 218 can then be diced so as to form individual holographic optical elements. A singulated holographic optical element is illustrated in FIG. 20b, wherein substrates 144 and 124 are segments of wafers 168 and 218 after singulation.

A light guide, such as trapezoidal light guide 118, is attached to the singulated holographic optical element by attaching either one of the light transmissive substrate (e.g. substrate 144) to the top surface (the surface with a smaller area as compared to the bottom surface) of the trapezoidal light guide, as illustrated in FIG. 20b.

The bottom surface of the trapezoidal light guide is attached to a top surface a packaged light valve (e.g. packaged light valve 120) so as to form desired light valve 140, as illustrated in FIG. 20c. The interface between the bottom surface of the trapezoidal light guide and top surface of the packaged light valve can be disposed therein an anti-reflection film. It is noted that when the light guide is joined (bonded) to the light transmissive portion of the package frame by an optical index matching adhesive material, an anti-reflection coating may not be necessary.

Figure 21:
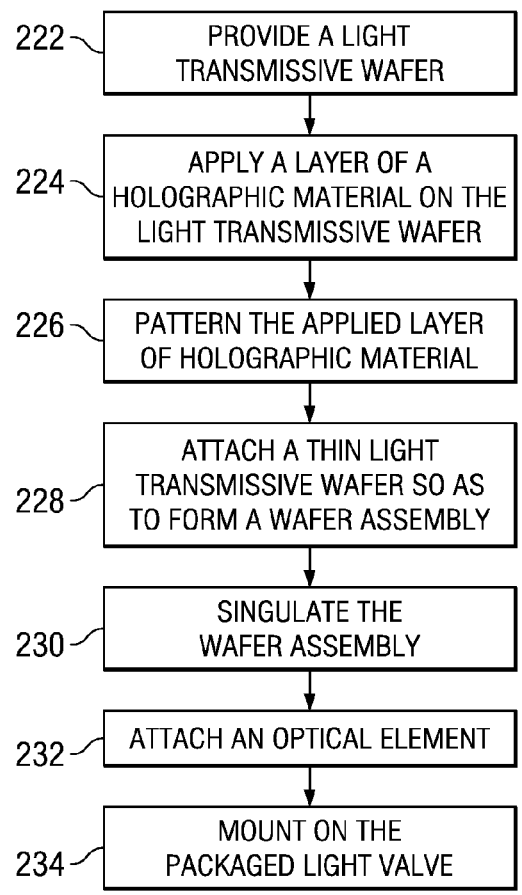

The method of making a light valve assembly as discussed above with reference to FIG. 20a through FIG. 20c is illustrated in a flow chart as shown in FIG. 21. Referring to FIG. 21, a light transmissive substrate, such as either one of the light transmissive wafers 168 and 218 in FIG. 20a, is provided (step 222). A layer of a selected holographic material is applied to one of the light transmissive wafers (step 224) followed by patterning the applied layer of holographic material (step 226) so as to form holographic material segments (and the desired diffractive patter). The patterned holographic optical elements can then be covered with another light transmissive wafer (step 228) so as to laminate the patterned holographic material segments between the light transmissive wafers. As discussed above in some examples especially when the holographic material is an environmental sensitive material, such as DCG, the patterned holographic material segments are preferably laminated such that there is substantially no air gap between the light transmissive wafers. The holographic material segments can further be isolated from the environment by disposing a sealing material that substantially fully surrounds the holographic optical elements.

The light transmissive wafers can then be diced so as to obtain individual holographic optical elements (step 230). The singulated holographic optical elements each can be attached to a trapezoidal light guide (step 232) followed by mounting a packaged light valve to the holographic optical element (step 234).

As an alternative fabrication method, the light valve assembly as discussed above with reference to FIG. 5a can be fabricated on a wafer-level as will be discussed following with reference to FIG. 22a through FIG. 22d.

Figure 22A:
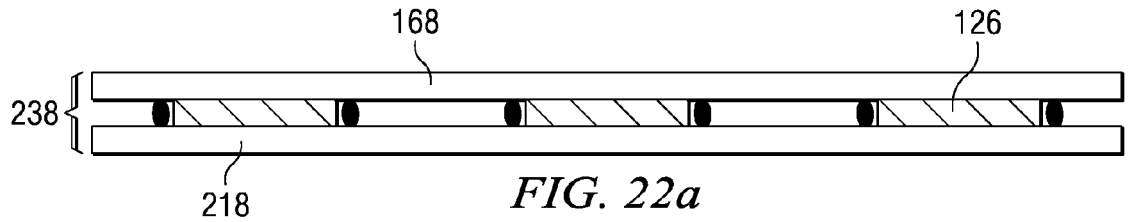
FIG. 22a through FIG. 22d schematically illustrate an exemplary method of making a light valve assembly illustrated in FIG. 5a on a wafer level.
Figure 22B:
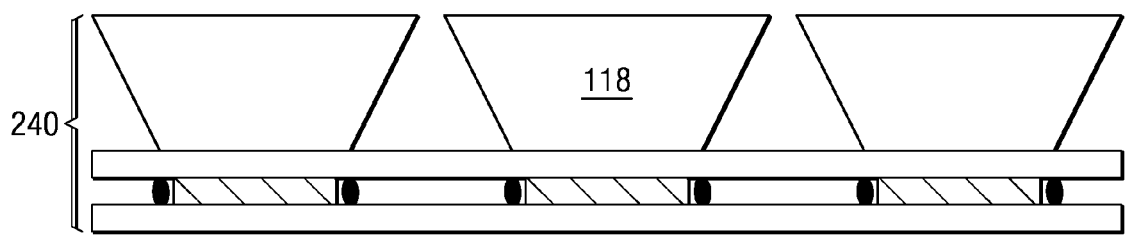

Referring to FIG. 22a, HOE wafer assembly 238 as discussed above with reference to FIG. 20a is formed. Before singulating HOE wafer assembly 238 to form individual holographic optical elements, trapezoidal light guides (e.g. 118) are attached to one of the light transmissive wafers (e.g. wafer 168 or wafer 128) so as to form light guide attached wafer assembly 240. The trapezoidal light guides each are attached to the light transmissive wafer at a corresponding to a micromirror array as illustrated in FIG. 22b.

Figure 22C:
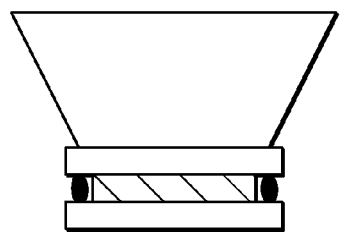
Figure 22D:
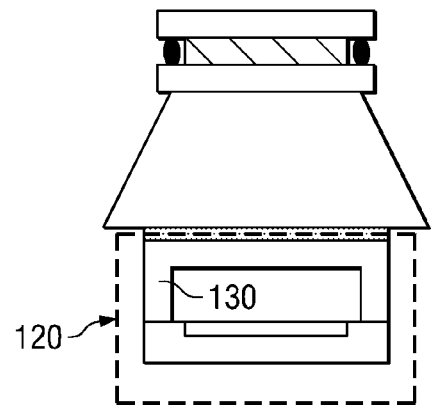

The light guide attached wafer assembly can be singulated as illustrated in FIG. 22c. The bottom surface of the trapezoidal light guide can then be attached to the top surface of a packaged light valve (120) so as to form the desired light valve assembly as illustrated in FIG. 22d. Before attaching the packaged light valve to the trapezoidal light guide, an anti-reflection film can be disposed on the top surface of the packaged light valve or on the bottom surface of the trapezoidal light guide. It is noted that when the light guide is joined (bonded) to the light transmissive portion of the package frame by an optical index matching adhesive material, an anti-reflection coating may not be necessary.

Figure 23A:
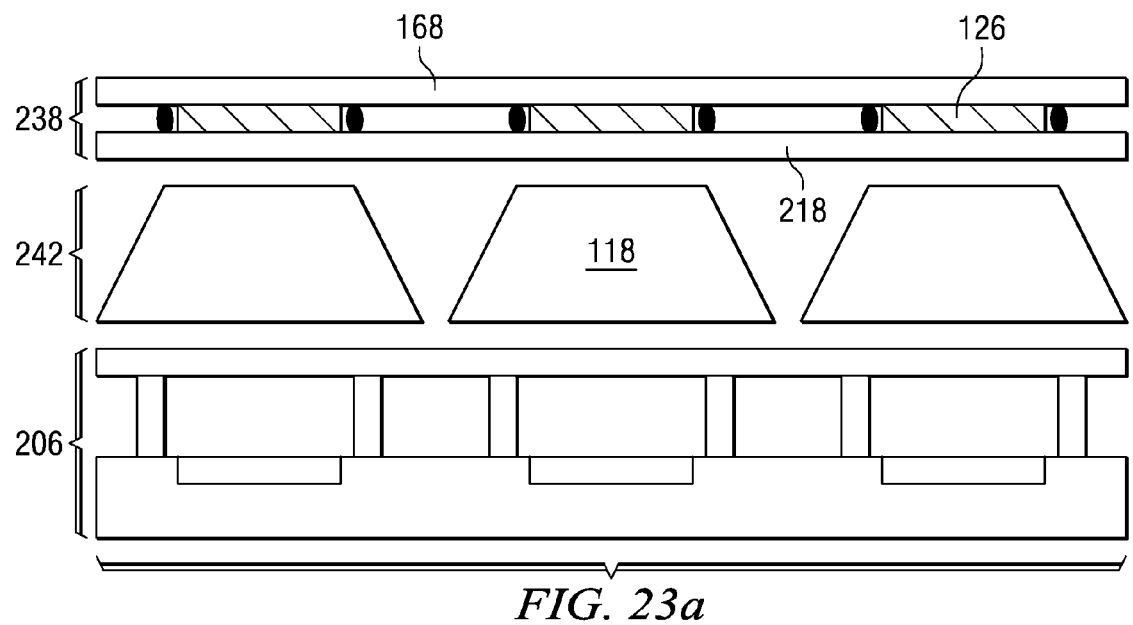
FIG. 23a and FIG. 23b schematically illustrate another exemplary method of making a light valve assembly illustrated in FIG. 5a on a wafer level.
Figure 23B:
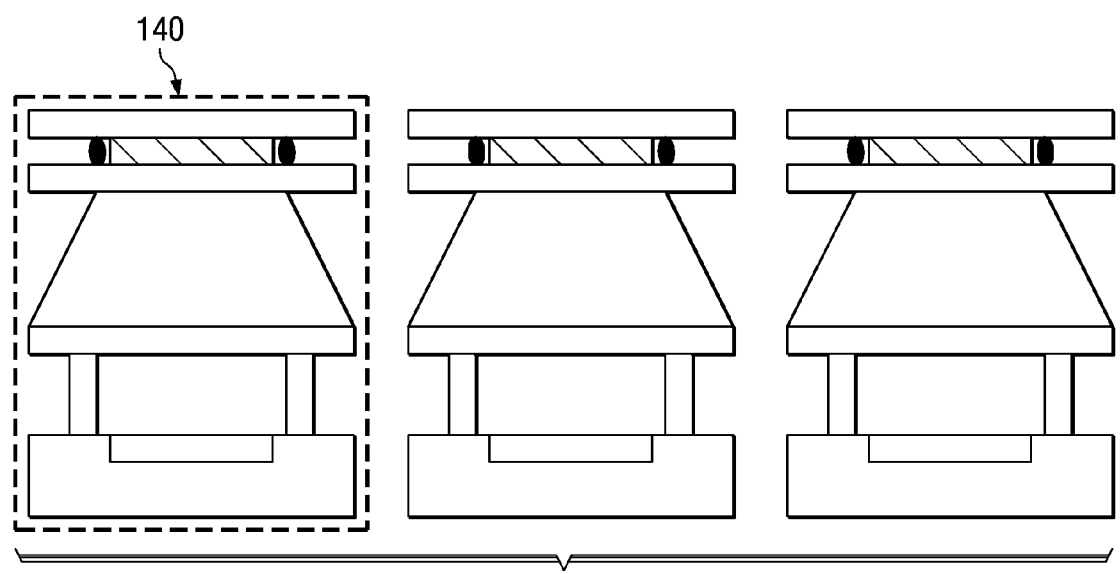

FIG. 23a and FIG. 23b schematically illustrate another exemplary method of making a light valve assembly as discussed above with reference to FIG. 5a on a wafer-level. Referring to FIG. 23a, HOE wafer assembly 238 is formed as discussed above with reference to FIG. 20a. A set (242) of trapezoidal light guides, such as trapezoidal light guide 118 is provided, along with a packaged light valve wafer 206. The light valve wafer can be the same as that discussed above with reference to FIG. 18c. In one example, the set (242) of trapezoidal light guides can be attached to HOE wafer assembly 238 of the holographic optical elements to form a light guide attached HOE wafer assembly by attaching the top surfaces of the trapezoidal light guides to one of the light transmissive wafers (168 and 218) of the HOE wafer assembly (238). The packaged light valve wafer (206) can then be attached to the bottom surfaces of the trapezoidal light guides that are attached to the HOE wafer assembly. The assembly of HOE wafer assembly 238, trapezoidal light guides (242), and packaged light valve wafer 206 can then be singulated so as to obtain individual light valve assemblies (e.g. 140), as illustrated in FIG. 23b. The singulation can be accomplished by cutting the semiconductor wafer of packaged light valve wafer 206 and the light transmissive wafers of HOE wafer assembly 238.

In another example, the set (242) of trapezoidal light guides can be attached to the packaged light valve wafer 206 followed by attaching the HOE wafer assembly to the trapezoidal light guides then followed by singulation to obtain individual light valve assemblies.

Figure 24:
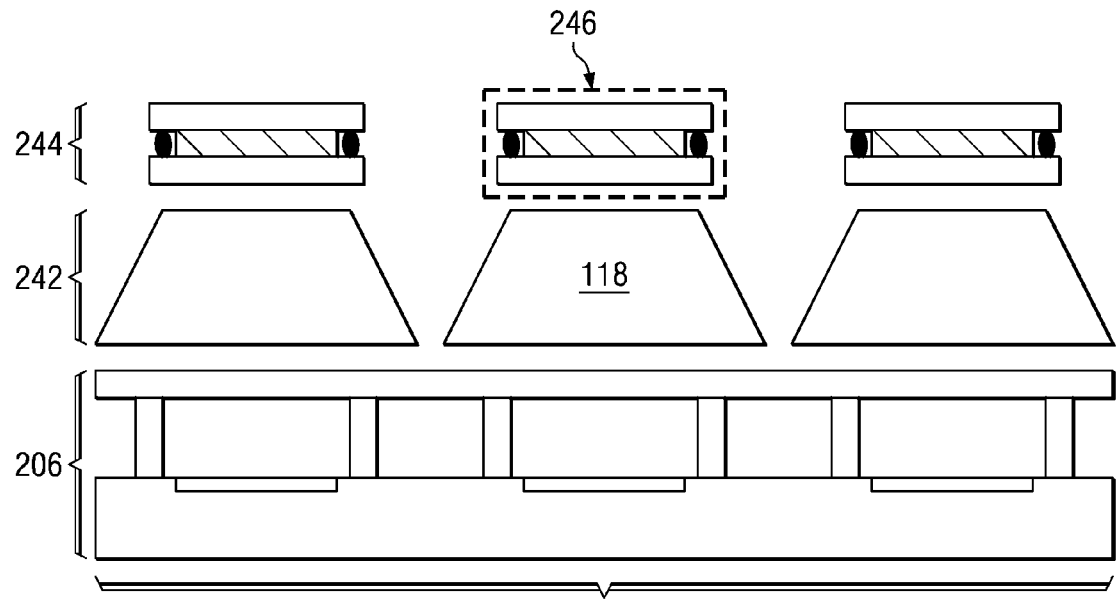
FIG. 24 schematically illustrates yet another exemplary method of making a light valve assembly illustrated in FIG. 5a on a wafer level.

FIG. 24 demonstrates another exemplary method of making a light valve assembly as discussed above with reference to FIG. 5a. Referring to FIG. 24, packaged light valve wafer 206 as discussed above with reference to FIG. 19a is formed. A set (242) of trapezoidal light guides, as well as a set (244) of individual holographic optical elements (e.g. 246) is provided. The set of individual holographic optical elements can be formed by forming a HOE wafer assembly 238 as discussed above with reference to FIG. 23a followed by singulating the HOE wafer assembly into individual holographic optical elements.

In one example, the trapezoidal light guides and holographic optical elements can be individually assembled followed by assembling the trapezoidal light guide/holographic optical element assemblies with the packaged light valve wafer (206). The assembly of the trapezoidal light guides, the holographic optical elements, and the packaged light valve wafer can then be singulated to obtain individual light valves as discussed above with reference to FIG. 5a.

In another example, the trapezoidal light guides can be assembled to the packaged light valve wafer (206) followed by attaching individual holographic optical elements to the trapezoidal light guides on the packaged light valve wafer. The assembly of the trapezoidal light guides, the holographic optical elements, and the packaged light valve wafer can then be singulated to obtain individual light valves as discussed above with reference to FIG. 5a.

Figure 25:
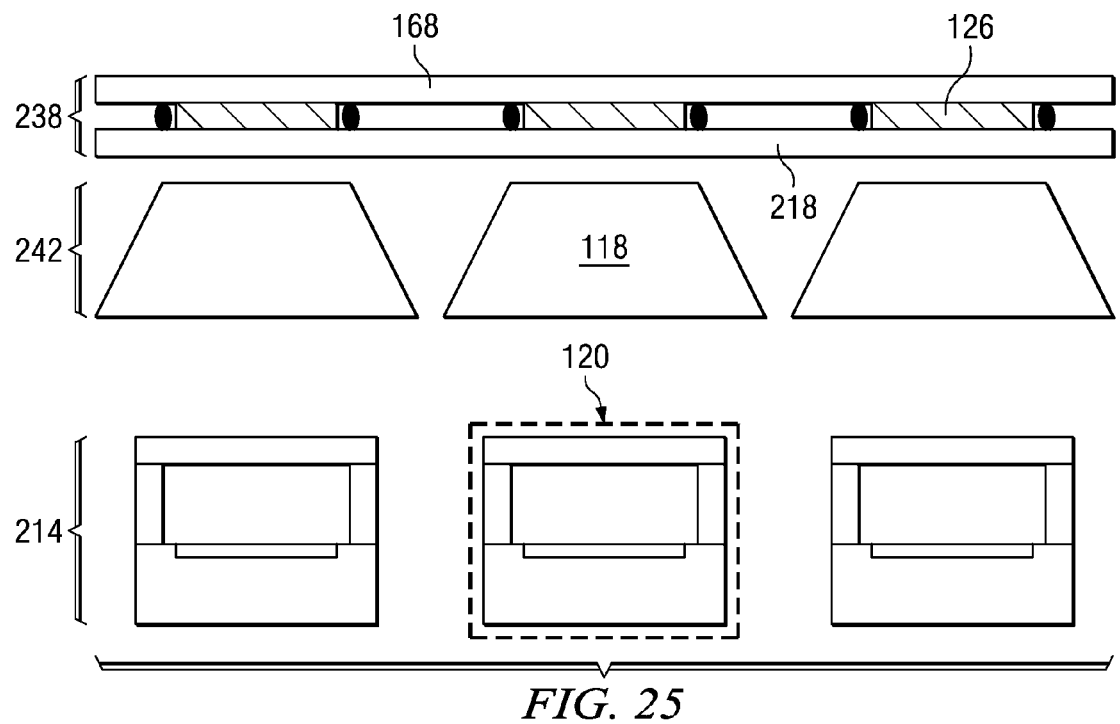
FIG. 25 schematically illustrates yet another exemplary method of making a light valve assembly illustrated in FIG. 5a on a wafer level.

FIG. 25 demonstrates yet another exemplary method of making a light valve assembly as discussed above with reference to FIG. 5a. Referring to FIG. 25, HOE wafer assembly 238 as discussed above with reference to FIG. 23a is formed. A set (242) of trapezoidal light guides, as well as a set (214) of individual packaged light valves (e.g. 120) is provided. The set of individual packaged light valves can be formed by a method as discussed above with reference to FIG. 9a through FIG. 9e and FIG. 10a, FIG. 10b, and FIG. 11.

In one example, the trapezoidal light guides and the HOE wafer assembly (238) can be assembled together using a method as discussed above with reference to FIG. 22b. The individual packaged light valves can then be attached to the bottom surfaces of the trapezoidal light guides followed by singulating the assembly into individual light valve assemblies.

In another example, the trapezoidal light guides can be assembled to the packaged light valves individually followed by attaching the HOE wafer assembly to the top surfaces of the trapezoidal light guides. The assembly of the trapezoidal light guides, the holographic optical elements, and the packaged light valve wafer can then be singulated to obtain individual light valves as discussed above with reference to FIG. 5a.

Figure 26A:
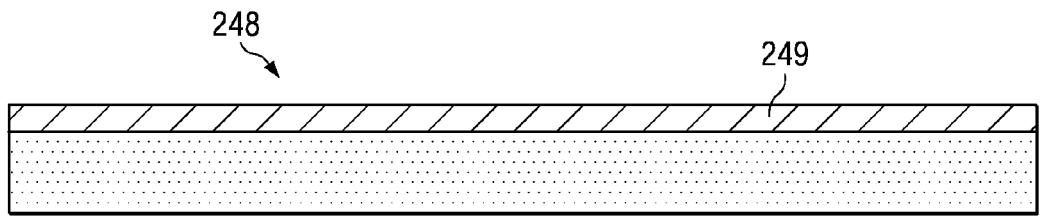
FIG. 26a through FIG. 26c schematically illustrate an exemplary method of making a light valve assembly illustrated in FIG. 6.
Figure 26B:
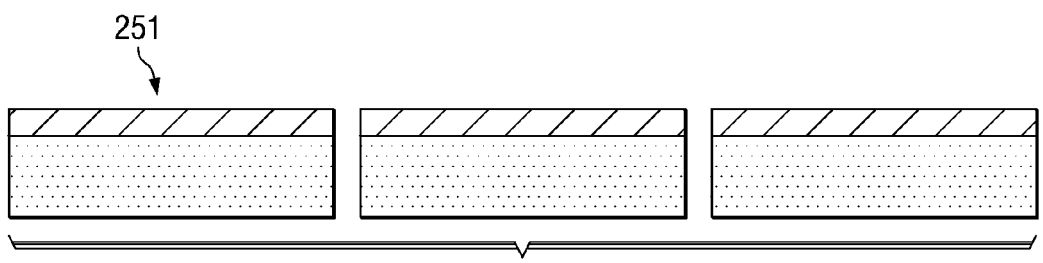
Figure 26C:
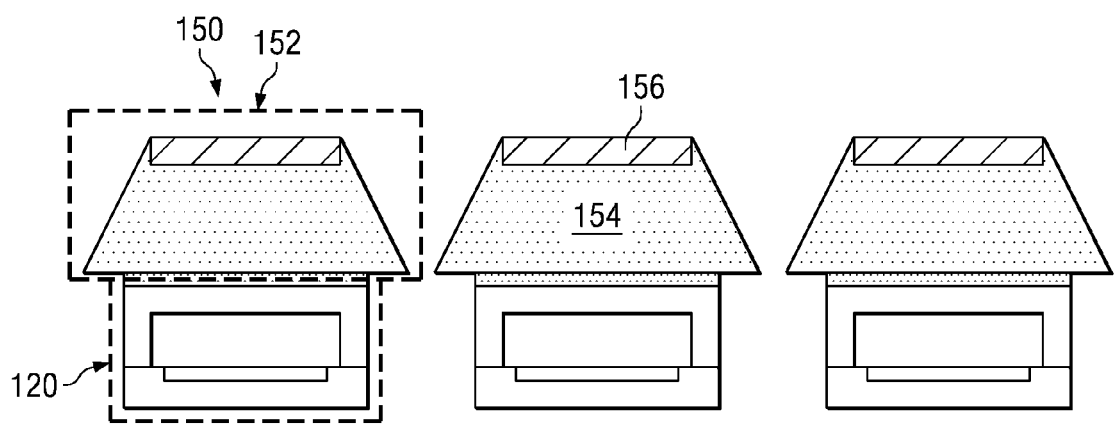

FIG. 26a through FIG. 26c schematically illustrates an exemplary method of making a light valve assembly as discussed above with reference to FIG. 6. Referring to FIG. 26a, a wafer (248) of a selected holographic material, such as a wafer of a photosensitive material or a quality light transmissive wafer is provided. The wafer (248) may have desired diffractive patterns 249 embedded therein. The wafer is then patterned into individual holographic material segments, such as segment 251, as illustrated in FIG. 26b. When the provided wafer 248 as shown in FIG. 26a does not have the desired diffractive pattern, the desired diffractive patterns can be formed during the patterning. For example, the desired diffractive patterns can be formed prior, after, or during segmenting wafer 248.

The holographic material segments in FIG. 26b can then be shaped into desired shapes, such as trapezoidal, by grind or other suitable methods so as to obtain desired holographic optical elements (e.g. 152 in FIG. 26c). A polishing step may be performed to polish the holographic material segments. When necessary, other optical components, such as non-holographic optical components, other holographic optical elements, and/or optical filters (e.g. anti-reflection films) can be attached to the holographic optical elements after grind and/or polish. The formed holographic optical elements are then assembled with packaged light valves (e.g. packaged light valve 120 in FIG. 26c) so as to obtain a light valve assembly as illustrated in FIG. 26c. In FIG. 26c, element 154 is the shaped holographic material segment, which takes a trapezoidal shape in this example such that element 154 can also function as a light guide. In particular, the trapezoidal element 154 has side facets facing the incident light beams for accepting the incident light beams an imaging system; and directing the incident light beams onto the grating (156) at proper incident angle(s).

Figure 27:
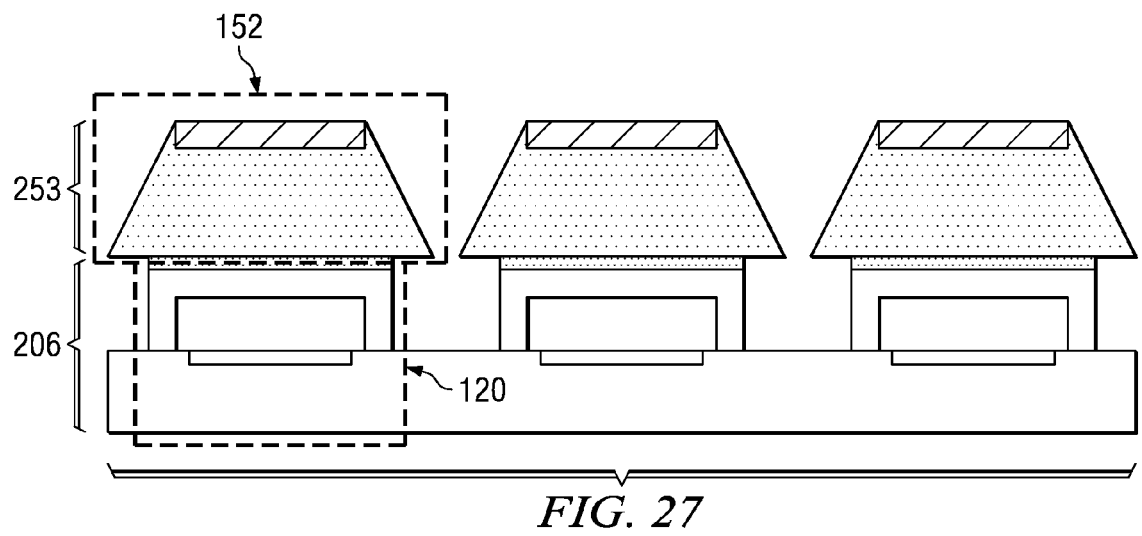
FIG. 27 schematically illustrates an exemplary method of making a light valve assembly illustrated in FIG. 6 on a wafer level.

FIG. 27 demonstrates an exemplary method of making a light valve assembly 150 as discussed above with reference to FIG. 6 on a wafer level. Referring to FIG. 27, a set (253) of holographic optical elements (shaped holographic material segments as discussed above with reference to FIG. 26b) is provided. The formed holographic optical elements can be assembled to the packaged light valves (e.g. 120) on packaged light valve wafer 206 as shown in FIG. 27. The assembled light valves on the wafer and holographic optical elements attached thereto can then be singulated from the wafer of the packaged light valves so as to obtain individual light valve assemblies.

Figure 28:
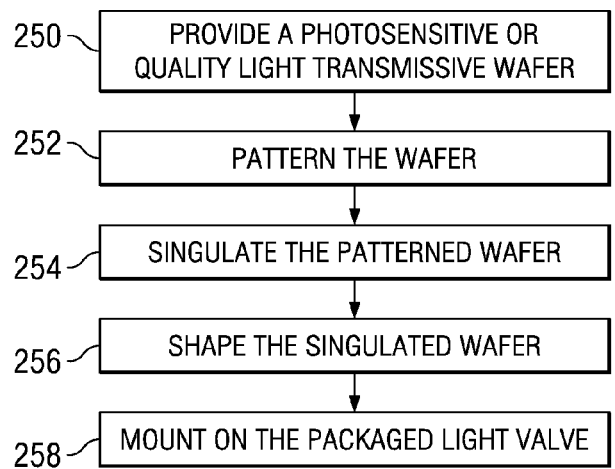
FIG. 28 is a flow chart having steps executed for making a light vale assembly illustrated in FIG. 6.

The method as discussed above is demonstrated in a flow chart as shown in FIG. 28. Referring to FIG. 28, a wafer of a photosensitive or a quality light transmissive material is provided at step 250 followed by patterning the wafer (step 252). The patterned wafer is then singulated into holographic material segments (step 254). The singulated holographic material segments are shaped as desired, such as holographic optical elements with a trapezoidal shape (step 256). Packaged light valves are then mounted to the formed holographic optical elements (step 258) so as to obtain individual light valve assemblies.

Figure 29A:
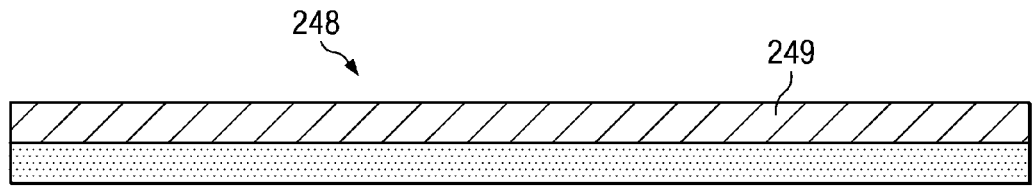
Figure 29B:
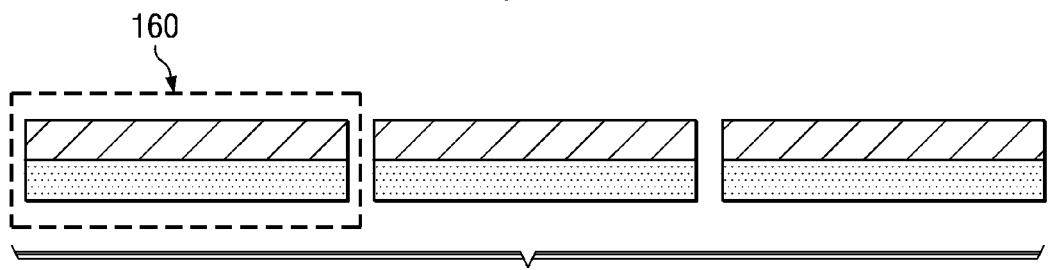
Figure 29C:
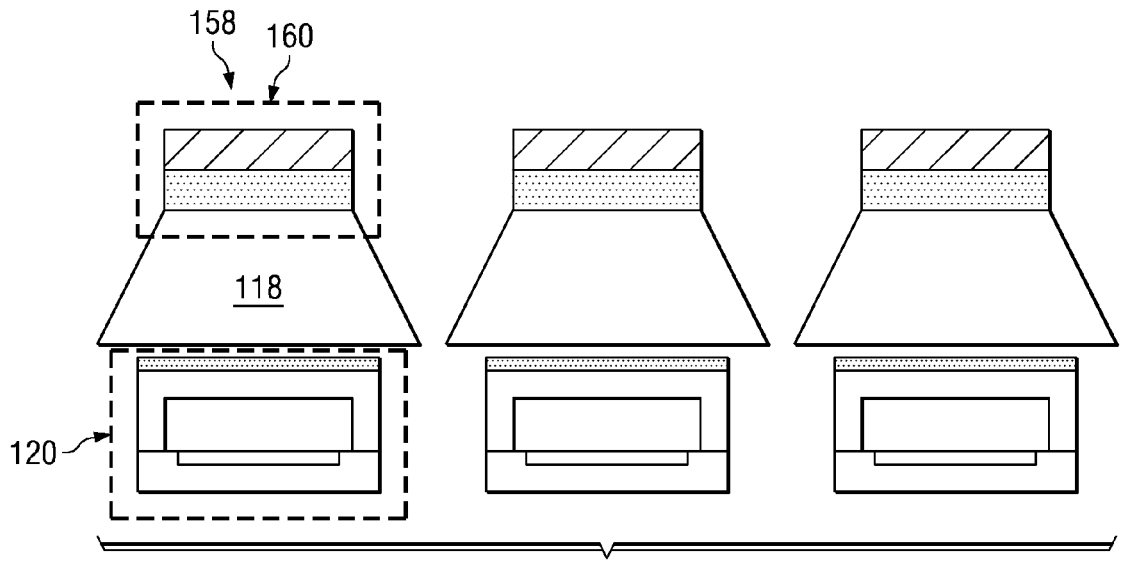

FIG. 29a through FIG. 29c demonstrate an exemplary method of making a light valve assembly as discussed above with reference to FIG. 7a. Referring to FIG. 29a, a wafer (248) of a selected holographic material, such as a wafer of a photosensitive material or a quality light transmissive wafer is provided. The wafer (248) may have desired diffractive patterns 249 embedded therein. The wafer is then patterned into individual holographic material segments, such as segment 160, as illustrated in FIG. 29b. When the provided wafer 248 as shown in FIG. 29a does not have the desired diffractive pattern, the desired diffractive patterns can be formed during the patterning. For example, the desired diffractive patterns can be formed prior, after, or during segmenting wafer 248.

The holographic material segments in FIG. 29b can then be shaped, though not required, into desired shapes, such as a shape matching the top surface of a trapezoidal light guide (118), by grind or other suitable methods so as to obtain desired holographic optical elements (e.g. 160 in FIG. 29c). A polishing step may be performed to polish the holographic material segments. When necessary, other optical components, such as non-holographic optical components, other holographic optical elements, and/or optical filters (e.g. anti-reflection films) can be attached to the holographic optical elements after grind and/or polish. Each formed holographic optical element can be attached to the top surface of a trapezoidal light guide as illustrated in FIG. 29c with a packaged light valve (e.g. 120) attached to the bottom surface of the trapezoidal light guide so as to form the desired light valve assembly (e g. 158).

Figure 30:
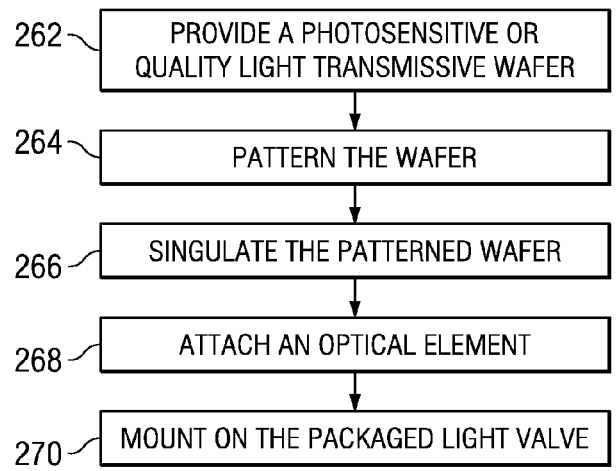

The above method is further illustrated in a flow chart as shown in FIG. 30. Referring to FIG. 30, a wafer of a photosensitive or a quality light transmissive material is provided at step 262 followed by patterning the provided wafer (step 264) so as to obtain desired holographic optical elements. The wafer with patterned holographic material segments can be singulated to obtain separate holographic optical elements. The separate holographic optical elements are attached to trapezoidal light guides (step 268). The optical assembly having the holographic optical element and trapezoidal light guide can then be assembled to a packaged light valve at step 270 so as to obtain a light valve assembly.

Figure 31A:
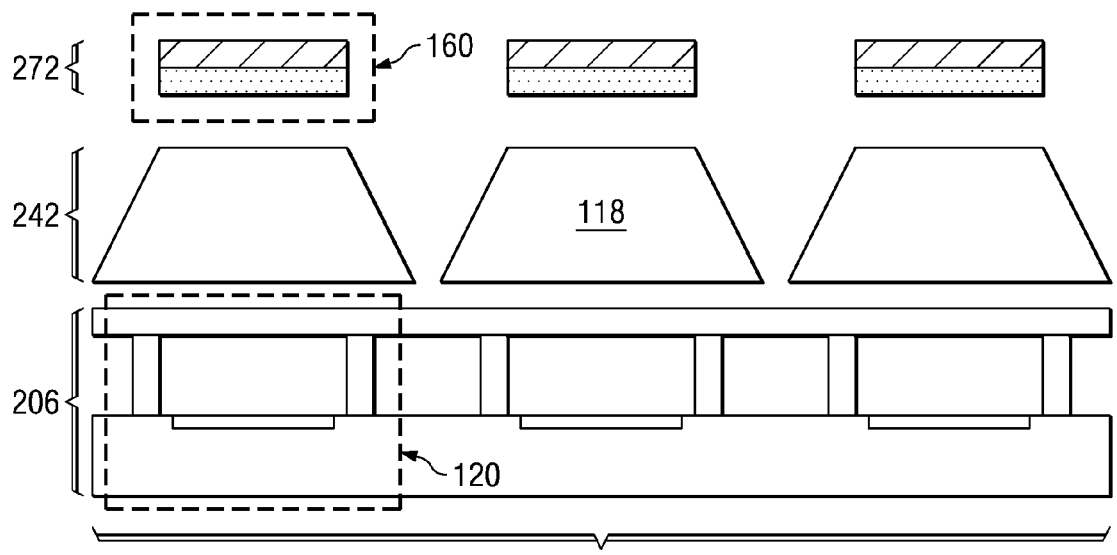
FIG. 31a and FIG. 31b schematically illustrate an exemplary method of making a light assembly illustrated in FIG. 7a on a wafer level.
Figure 31B:
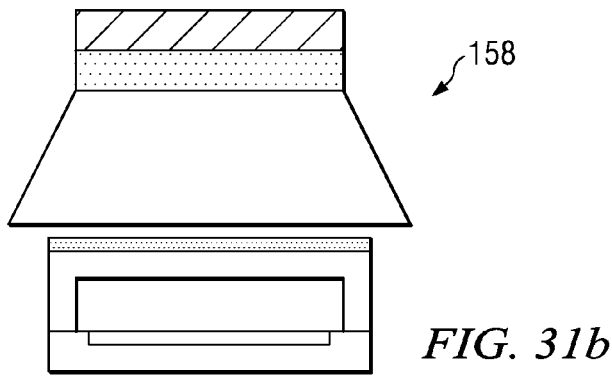

The method as discussed above with reference to FIG. 29a through FIG. 29c can be performed on a waver-level, an example of which is schematically illustrated in FIG. 31a and FIG. 31b.

Referring to FIG. 31a, a set (272) of holographic optical elements (e.g. 160), such as those in FIG. 29b, is formed, for example using the method as discussed above with reference to FIG. 29a and FIG. 29b. A set (242) of optical components, such as trapezoidal light guides (118), is provided. The holographic optical elements and the optical components can be assembled to the packaged light valves (e.g. 120) on packaged light valve wafer (206). For example, the optical components can be assembled to the packaged light valves of the wafer (206) followed by assembling the holographic optical elements. Alternatively, the optical components can be assembled to the holographic optical elements then assembling the optical assemblies (including the optical components and holographic optical elements) to the packaged light valves of wafer 206. In either method, the packaged light valve wafer (206) can be diced so as to obtain separated light valve assemblies (e.g. 158), as illustrated in FIG. 31b.

Figure 32A:
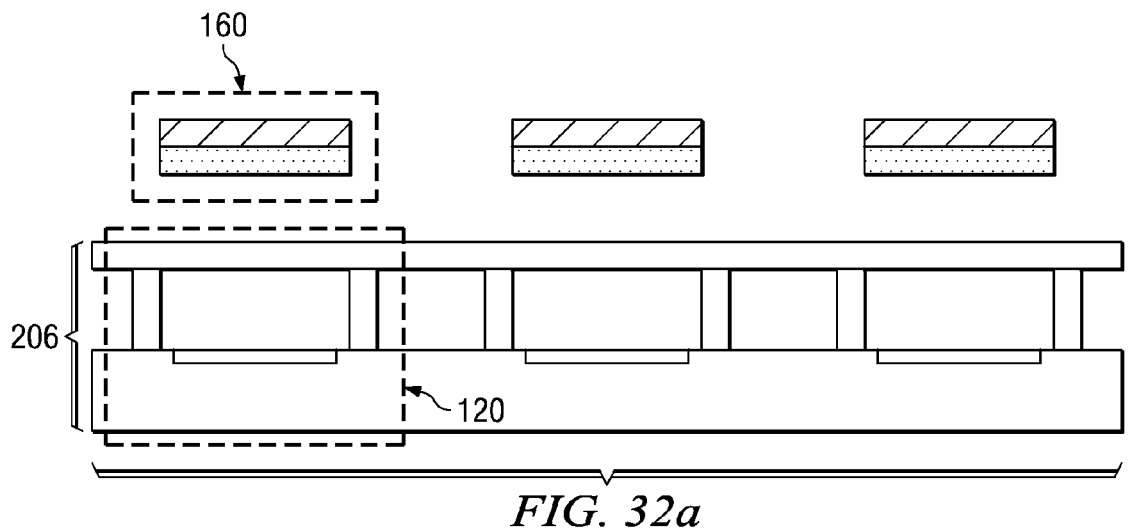
FIG. 32a and FIG. 32b schematically illustrate an exemplary method of making a light assembly illustrated in FIG. 7b.
Figure 32B:
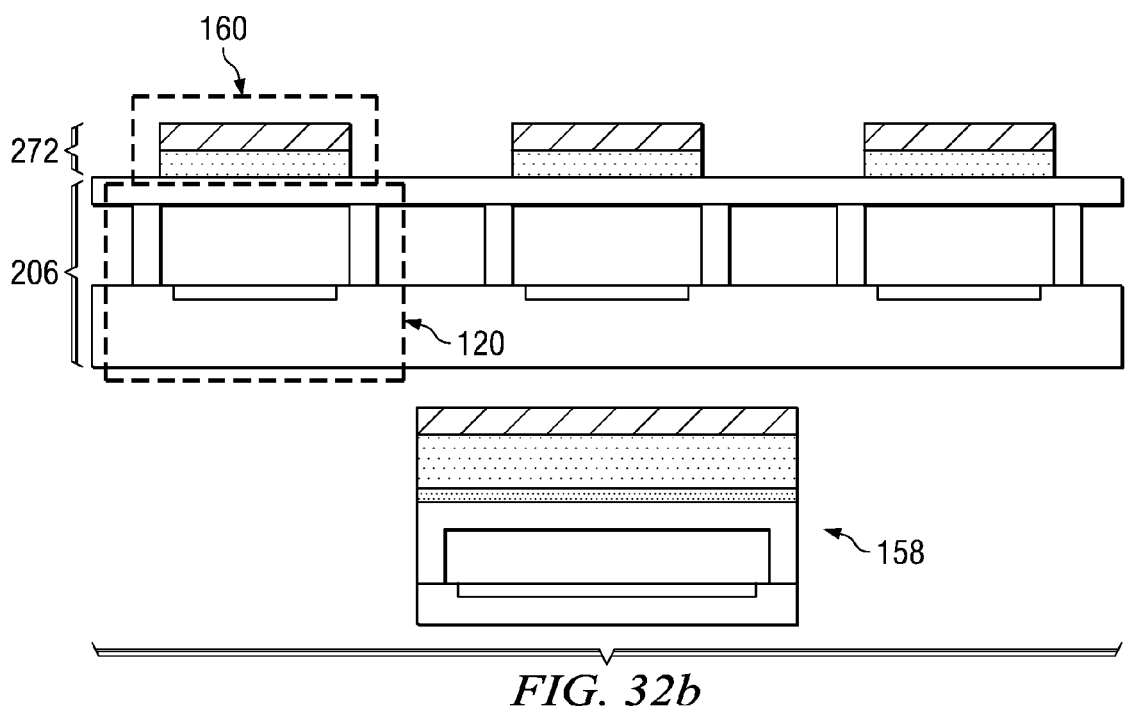

In the example wherein the holographic optical elements are directly assembled to the packaged light valves in the absence of optical component, as that discussed above with reference to FIG. 7b, the separate holographic optical elements (e.g. 160) can be directly assembled to the packaged light valves (e.g. 120) of wafer 206, as schematically illustrated in FIG. 32a and FIG. 32b. The assembly (including the holographic optical elements and packaged light valves of wafer 206) can then be singulated to obtain separated light valve assemblies, as illustrated in FIG. 32b.

In the above examples as discussed with reference to FIG. 8a through FIG. 32b, the package frames of the packaged light valve, such as package frame 186 in FIG. 10a, are provided for protecting the light valve; and the holographic optical elements are assembled to the light valve through the package frames. In other examples, the package frame can be a member of the light valve. Specifically, the package frame can also be provided as a light transmissive substrate on which the pixels of the light valve, such as deflectable and reflective mirror plates, are formed. In this instance, the holographic optical elements can be directly attached to the light valve, or attached to the light valve through optical components (e.g. trapezoidal optics).

It is noted that the above discussed examples are for demonstration purpose only, many other variations within the scope this disclosure are also applicable. For example, instead of attaching a packaged light valve to a light guide, the packaged light valve can be attached to the holographic optical element, as schematically illustrated in FIG. 33.

Figure 33:
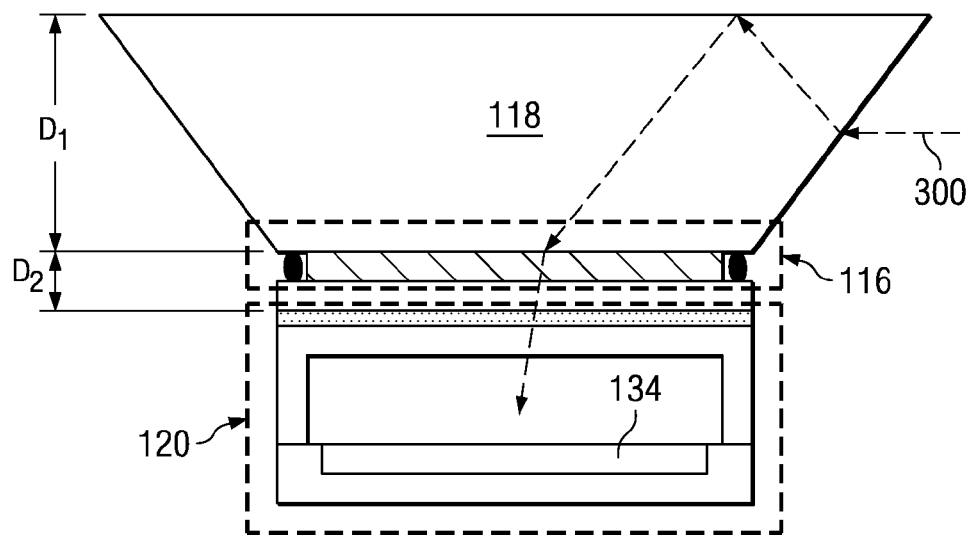
FIG. 33 schematically illustrates attachment of packaged light valve to a holographic optical element.

Referring to FIG. 33, packaged light valve 120 is attached to holographic optical element 116 that is attached to light guide 118 such that the holographic optical element is laminated between the light guide and the packaged light valve. The light guide in this example is a trapezoidal light guide, and can be replaced by many other suitable light guides, such as light guide 154. The trapezoidal light guide is attached to the holographic optical element by the top surface (the shorter surface). With this configuration, incident light 300 incident to a side facet of the light guide (118) is refracted to the bottom surface (the longer surface of the trapezoidal light guide), wherein the bottom surface forms a TIR surface with the environment. At the TIR bottom surface, the incident light is reflected towards the grating of the holographic optical element (116). The illumination after the grating of the holographic optical element (116) is then directed towards light valve 134 to illuminate the light valve pixels. In this example, the holographic optical element and the grating (diffractive pattern) embedded therein are transmissive to the incident light.

Figure 34:
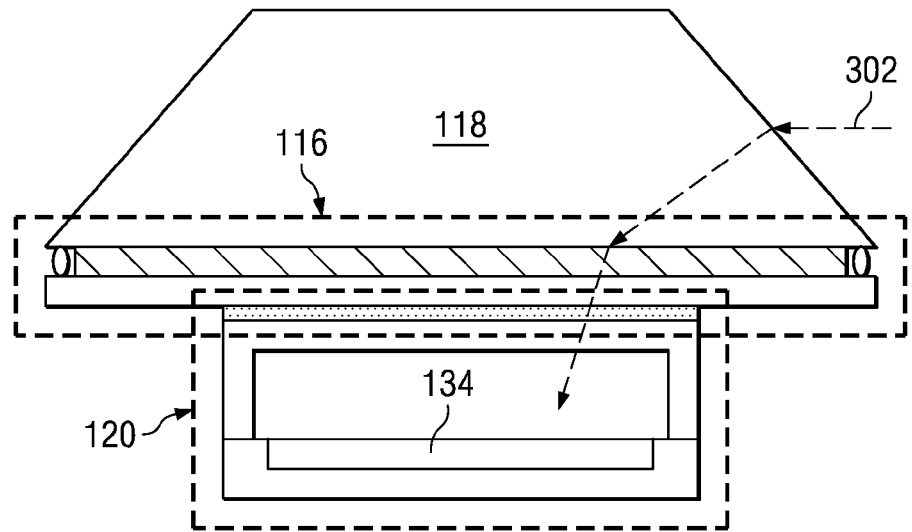
FIG. 34 schematically illustrates lamination of a holographic optical element between bottom surface of a trapezoidal light guide and a packaged light valve.

Alternatively, the holographic optical element can be laminated between the bottom surface (the long surface) of the trapezoidal light guide and the packaged light valve, as schematically illustrated in FIG. 34. Referring to FIG. 34, the bottom surface (the long surface) of the trapezoidal light guide 118 is attached to one surface of the holographic optical element (116); and the packaged light valve (120) is attached to the opposite side of the holographic optical element. Incident light 302 is incident to a side facet of the trapezoidal light guide, and refracted towards the bottom surface of the trapezoidal light guide and the holographic optical element. The refracted light passes through the grating of the holographic optical element and travels towards the light valve (134). In this example, the holographic optical element and the grating (diffractive pattern) embedded therein are transmissive to the incident light.

Figure 35:
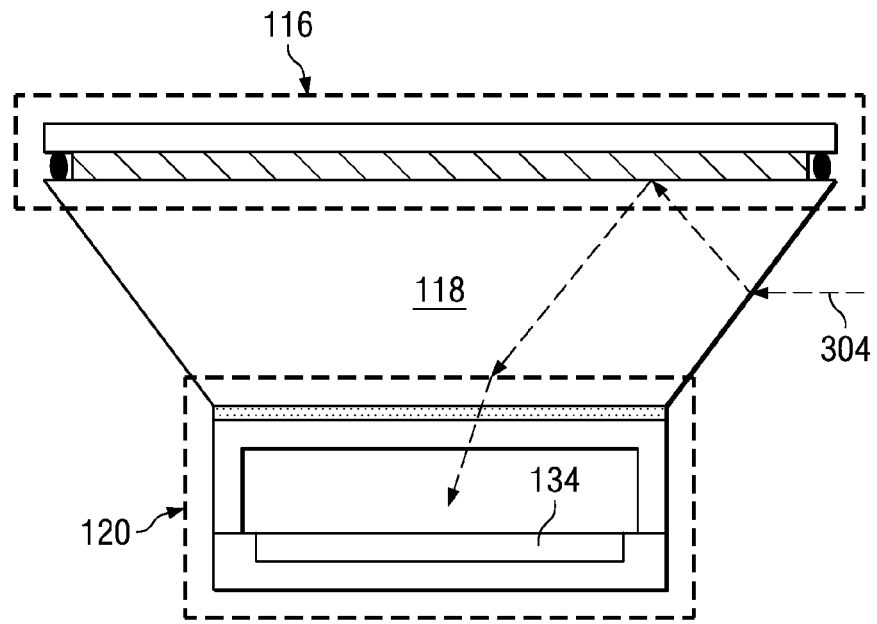
FIG. 35 schematically illustrates lamination of a light guide between a holographic optical element and a packaged light valve.

FIG. 35 schematically illustrates yet another exemplary configuration. Referring to FIG. 35, light guide 118 is laminated between holographic optical element 116 and packaged light valve 120 with the holographic optical element being attached to the bottom surface of the trapezoidal light guide; and the packaged light valve being attached to the top surface (the shorter surface) of the trapezoidal light guide. Light 304 incident onto a side facet of trapezoidal light guide is refracted by the facet towards the grating of holographic optical element 16. The light from the grating of the holographic optical element arrives at the light valve through the top surface of the trapezoidal light guide. In this example, the holographic optical element and the grating (diffractive pattern) embedded therein are reflective to the incident light.

Figure 36:
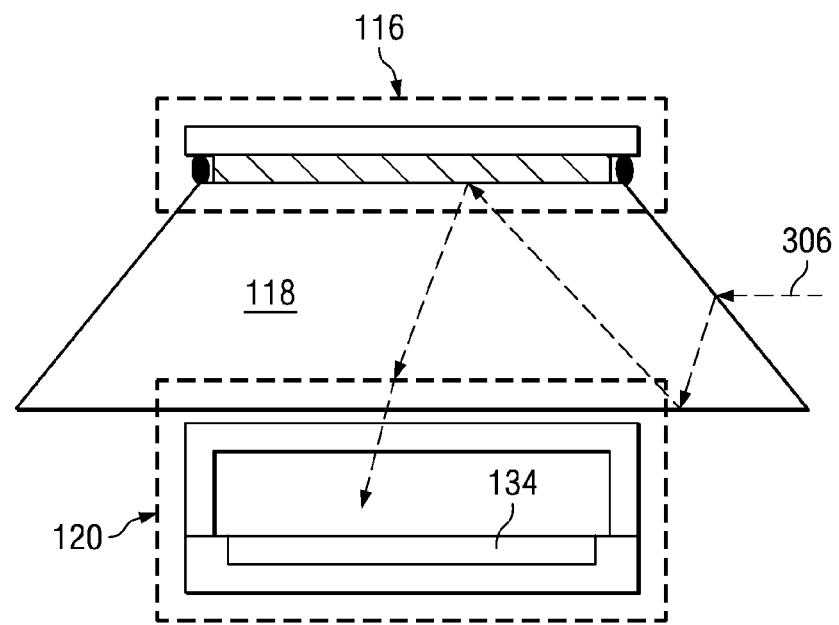
FIG. 36 schematically illustrates attachment of a holographic optical element and a packaged light valve to top and bottom surfaces of a trapezoidal light guide, respectively.

In yet another example as schematically illustrated in FIG. 36, holographic optical element 116 can be attached to the top surface of the trapezoidal light guide; and the packaged light valve can be attached to the bottom surface of the trapezoidal light guide. However, an air gap can be formed between the packaged light valve and the bottom surface of the trapezoidal light guide in favor of the light steering within the assembly. Specifically, light 306 incident onto a facet of the trapezoidal light guide is refracted by the facet towards the bottom surface of the trapezoidal light guide. Because the air gap and the bottom surface form a TIR surface, the refracted light from the facet of the trapezoidal light guide is internally refracted towards the grating of the holographic optical element 116. The light after the grating is incident to light valve 134 through the bottom surface of the trapezoidal light guide and the air gap, as illustrated in FIG. 36. In this example, the holographic optical element and the grating (diffractive pattern) embedded therein are reflective to the incident light.

It will be appreciated by those of skill in the art that a new and useful light valve assembly comprising a holographic optical element and a light valve and a method for making the same have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated examples can be modified in arrangement and detail. For example, even though in examples as discussed above the light valves are enclosed within a package that comprises a package frame, it is not an absolute requirement. In other examples, the light valve may not be packaged or packaged within a package frame. For example, the pixels of the light valve can be disposed between two substrates with the top substrate being a light transmissive substrate. In this example, the light guide, or the holographic element can be attached to or bonded to the top light transmissive substrate with an air gap or by an optical index matching bonding material (e.g. an adhesive). In other examples, a holographic material of this disclosure may not be assembled to a light valve. Therefore, the devices and methods as described herein contemplate all such embodiments as may come within the scope of the following claims and equivalents thereof.

We claim:

1. A device comprising:
   a light valve comprising an array of individually addressable pixels;
   a diffractive optical element comprising a diffractive pattern, wherein the diffractive optical element is integrated with the light valve so as to form a light valve assembly; and
   a light guide laminated between the diffractive optical element and a package frame of a light valve package in which the light valve is enclosed.

2. The device of claim 1, wherein the light valve comprises an array of reflective and deflectable micromirrors, or an array of liquid-crystal-display cells.

3. The device of claim 1, wherein the light guide is attached to the light valve by bonding a bottom surface of the light guide to a top substrate of the light valve with an air gap therebetween so as to form a total-internal-reflective interface.

4. A device comprising:
   a light valve comprising an array of individually addressable pixels; and
   a diffractive optical element comprising a diffractive pattern, wherein the diffractive optical element is integrated with the light valve so as to form a light valve assembly, wherein the diffractive optical element is laminated between a light transmissive substrate and a package frame of a light valve package in which the light valve is enclosed, and wherein the light transmissive substrate is bonded to the package frame.

5. The device of claim 4, wherein said light transmissive substrate is bonded to the light valve.

6. The device of claim 4, wherein the light valve comprises an array of reflective and deflectable micromirrors, or an array of liquid-crystal-display cells.

7. A device comprising:
   a light valve comprising an array of individually addressable pixels; and
   a diffractive optical element comprising a diffractive pattern, wherein the diffractive optical element is integrated with the light valve so as to form a light valve assembly, wherein the diffractive pattern is embedded within a holographic material, said holographic material being attached to a transmissive light guide that is disposed between the holographic material and the light valve.

8. The device of claim 7, wherein the light valve comprises an array of reflective and deflectable micromirrors, or an array of liquid-crystal-display cells.

9. An imaging system, comprising:
   an illumination system providing illumination light;
   a light valve comprising an array of individually addressable pixels for modulating the illumination light into modulated light; and
   a diffractive optical element disposed between the illumination system and the light valve pixels for generating an illumination field on the light valve pixels, wherein the modulated light from the light valve pixels is substantially non-interfering so as to cause a two dimensional image on a screen.

10. The system of claim 9, wherein the diffractive optical element is integrated with the light valve so as to form a light valve assembly such that the illumination light is capable of illuminating the light valve pixels through a diffractive pattern of the diffractive optical element.

11. The system of claim 9, wherein the illumination system comprises a solid-state illuminator capable of emitting a phase-coherent light beam.

12. The system of claim 11 being a rear projection system, a front projection system, or a rear-projection TV.

13. A method of making a light valve assembly, comprising:
    providing a plurality of diffractive optical elements on a light transmissive substrate;
    providing a plurality of light valves on a light valve substrate, wherein each light valve comprises an array of individually addressable pixels;
    assembling the light transmissive substrate with the light valve substrate so as to form a wafer assembly such that at least one of the diffractive optical elements is assembled to one of the light valves forming the light valve assembly; and
    singulating the wafer assembly so as to form individual light valve assemblies, wherein each light valve assembly comprises a diffractive optical element and a light valve.

14. The method of claim 13, wherein each light valve is enclosed within a light valve package having a package frame; and wherein the step of assembling the light transmissive substrate with the light valve substrate further comprises:
    assembling the light transmissive substrate with the light valve substrate such that a diffractive optical element is assembled to a light valve through a package frame.

15. The method of claim 13, further comprising:
    singulating the diffractive optical elements from the light transmissive substrate before assembling the light transmissive substrate with the light valve substrate; and
    wherein the step of assembling the light transmissive substrate with the light valve substrate comprises:
    assembling the singulated diffractive optical elements each on a portion of the light transmissive substrate with the light valve substrate; and
    wherein the step of singulating the wafer assembly further comprises:
    singulating the light valve substrate so as to obtain individual light valve assemblies.

16. The method of claim 13, further comprising:
    singulating the light valves from the light valve substrate before assembling the light transmissive substrate with the light valve substrate, wherein the step of assembling the light transmissive substrate with the light valve substrate comprises:
    assembling the singulated light valves each on a portion of the singulated light valve substrate with the light transmissive substrate, wherein the step of singulating the wafer assembly further comprises:
    singulating the light transmissive substrate so as to obtain individual light valve assemblies.

17. The method of claim 13, further comprising:
    attaching a light guide to a diffractive optical element.

18. A method of forming a light valve assembly that comprises a light valve and a diffractive optical element, the method comprising:

providing a plurality of diffractive optical elements on a first substrate, wherein each diffractive optical element comprises a diffractive pattern in or on a surface of the first substrate;

providing a plurality of light valves on a second substrate, wherein each light valve comprises an array of individually addressable pixels;

assembling the first and second substrates so as to form a wafer assembly such that at least one of the diffractive optical elements is assembled to one of the light valves forming the light valve assembly; and singulating the wafer assembly so as to form individual light valve assemblies, wherein each light valve assembly comprises a diffractive optical element and a light valve.

19. The method of claim 18, wherein the first substrate comprises a photoresistive material.

20. The method of claim 18, further comprising:

before assembling the first and second substrates, singulating the first substrate into a plurality of portions of the first substrate with each portion comprising a diffractive pattern; and wherein the step of assembling the first and second substrates is performed by assembling the singulated portions of the first substrate to the second substrate.

21. The method of claim 20, further comprising:

shaping the portion of the first substrate into a light guide with a trapezoidal shape.

22. The method of claim 20, further comprising:

attaching a light guide transmissive to the visible light to each diffractive optical element.

23. A method of modulating a beam of incident light using a light valve that comprises an array of individually addressable pixels, the method comprising:

directing the light beam onto a surface of a light guide;

directing the light beam towards a diffractive pattern of a diffractive optical element after a refraction of the light beam at said surface of the light guide;

directing the light beam after the diffractive pattern towards the light valve; and modulating the light beam after the diffractive pattern, wherein the diffractive pattern, the light guide, and the light valve are integrated in a light valve assembly.

24. The method of claim 23, wherein the step of directing the light beam towards the diffractive pattern comprises:

refracting the light beam towards a bottom surface of the light guide at said surface to which the light beam is incident, wherein said surface is a side facet of the light guide; and refracting the light beam at the bottom surface that is a TIR surface of the light guide towards the diffractive pattern that is attached to a top surface of the light guide.

25. The method of claim 23, wherein the diffractive optical element is transmissive or reflective to visible light.

26. The method of claim 23, wherein the step of directing the light beam towards the diffractive pattern comprises:

refracting the light beam towards a bottom surface of the light guide at said surface to which the light beam is incident, wherein said surface is a side facet of the light guide, wherein the diffractive pattern is attached to the bottom surface.

* * * * *